(12) United States Patent
Cismas

(10) Patent No.: US 8,165,219 B2
(45) Date of Patent: Apr. 24, 2012

(54) MEMORY WORD ARRAY ORGANIZATION AND PREDICTION COMBINATION FOR MEMORY ACCESS

(75) Inventor: Sorin C Cismas, Saratoga, CA (US)

(73) Assignee: Maxim Integrated Products, Inc., Sunnyvale, CA (US)

( * ) Notice: Subject to any disclaimer, the term of this patent is extended or adjusted under 35 U.S.C. 154(b) by 869 days.

(21) Appl. No.: 10/794,280

(22) Filed: Mar. 3, 2004

(65) Prior Publication Data

US 2004/0190632 A1 Sep. 30, 2004

Related U.S. Application Data

(60) Provisional application No. 60/451,882, filed on Mar. 3, 2003.

(51) Int. Cl.
*H04N 9/877* (2006.01)
*H04N 7/36* (2006.01)
*G09G 5/393* (2006.01)
*G09G 5/39* (2006.01)

(52) U.S. Cl. ......... 375/240.25; 375/240.12; 375/240.16; 345/530; 345/547

(58) Field of Classification Search .................. 348/699; 375/240.16, 240.17, 240.25, 240.26, 240.12, 375/240.14; 382/236; 345/530, 547
See application file for complete search history.

(56) References Cited

U.S. PATENT DOCUMENTS

| | | | | |
|---|---|---|---|---|
| 5,251,030 A | * | 10/1993 | Tanaka | 375/240.16 |
| 5,448,310 A | * | 9/1995 | Kopet et al. | 348/699 |
| 5,453,786 A | * | 9/1995 | Trent | 375/240.01 |
| 5,486,876 A | * | 1/1996 | Lew et al. | 348/719 |
| 5,675,387 A | | 10/1997 | Hoogenboom et al. | |
| 5,717,441 A | * | 2/1998 | Serizawa et al. | 345/573 |
| 5,736,988 A | * | 4/1998 | Shaw et al. | 345/423 |
| 5,751,364 A | * | 5/1998 | Yasuda et al. | 375/240.16 |
| 5,973,985 A | * | 10/1999 | Ferrant | 365/230.05 |

(Continued)

FOREIGN PATENT DOCUMENTS

JP 8-195960 7/1996

(Continued)

OTHER PUBLICATIONS

ISO Standard 11172-2, Coding of Moving Images and Associated Audio: Part 2, Video (MPEG-1), Aug. 1993.*

(Continued)

*Primary Examiner* — David Czekaj
*Assistant Examiner* — David N Werner
(74) *Attorney, Agent, or Firm* — North Weber & Baugh

(57) ABSTRACT

Described systems and methods allow a reduction in the memory bandwidth required in video coding (decoding/encoding) applications. According to a first aspect, the data assigned to each memory word is chosen to correspond to a 2D subarray of a larger array such as a macroblock. An array memory word organization allows reducing both the average and worst-case bandwidth required to retrieve predictions from memory in video coding applications, particularly for memory word sizes (memory bus widths) larger than the size of typical predictions. According to a second aspect, two or more 2D subarrays such as video predictions are retrieved from memory simultaneously as part of a larger 2D array, if retrieving the larger array requires fewer clock cycles than retrieving the subarrays individually. Allowing the combination of multiple predictions in one memory access operation can lead to a reduction in the average bandwidth required to retrieve predictions from memory.

32 Claims, 11 Drawing Sheets

U.S. PATENT DOCUMENTS

| | | | | |
|---|---|---|---|---|
| 6,005,624 | A * | 12/1999 | Vainsencher | 375/240.14 |
| 6,081,209 | A * | 6/2000 | Schuyler et al. | 341/51 |
| 6,145,073 | A | 11/2000 | Cismas | |
| 6,154,413 | A * | 11/2000 | Longwell et al. | 365/230.03 |
| 6,289,049 | B1 * | 9/2001 | Kim et al. | 375/240.16 |
| 6,289,050 | B1 * | 9/2001 | Ohtani et al. | 375/240.16 |
| 6,335,950 | B1 | 1/2002 | Kohn | |
| 6,400,763 | B1 * | 6/2002 | Wee | 375/240.16 |
| 6,411,652 | B1 * | 6/2002 | Sivan | 375/240.16 |
| 6,490,652 | B1 * | 12/2002 | Van Hook et al. | 711/118 |
| 6,549,576 | B1 * | 4/2003 | Moriyoshi | 375/240.16 |
| 6,567,556 | B1 * | 5/2003 | Bramley | 382/233 |
| 6,934,332 | B1 * | 8/2005 | Auyeung et al. | 375/240.16 |
| 7,093,094 | B2 | 8/2006 | Cismas | |
| 2001/0055427 | A1 | 12/2001 | Freeman | |
| 2002/0041631 | A1 * | 4/2002 | Arita et al. | 375/240.16 |
| 2003/0068091 | A1 * | 4/2003 | Schwartz et al. | 382/246 |
| 2003/0142872 | A1 * | 7/2003 | Koyanagi | 382/236 |

FOREIGN PATENT DOCUMENTS

| | | | |
|---|---|---|---|
| WO | WO 02/056600 A1 | 7/2002 | |

OTHER PUBLICATIONS

ITU-T Recommendation H.262 (Jul. 1995).*

PCT International Search Report and PCT Written Opinion of the International Searching Authority for PCT International Application No. PCT/US2004/006925, International Filing Date Mar. 3, 2004, Priority Date Mar. 3, 2003.

Kim, Hansoo et al., "High-Performance and Low Power Memory-Interface Architecture for Video Processing Applications," *IEEE Transactions on Circuits and Systems for Video Technology*, IEEE Inc., New York, U.S.A., vol. 11, No. 11, Nov. 2001, pp. 1160-1170.

International Organization for Standardisation, "Text of Final Committee Draft of Joint Video Specification (ITU-T Rec. H.264/ISO/IEC 14496-10 AVC)," Jul. 2002, pp. i-xv, 1-197.

Japan Patent Office (JPO) Office Action issued Apr. 22, 2008 for Japanese patent application No. 2006-501222.

European Patent Office (EPO) Examination Report issued Aug. 26, 2008 for EPO Application No. 04 716 981.8-1247.

Office Action mailed Feb. 5, 2009 for Japanese Patent Application No. 2006-501222, the Japanese national phase of PCT/US2004/006925.

Kim et al., Array Address Translation for SDRAM-Based Video Processing Applications, Proc. of SPIE Visual Communications and Image Processing 2000, Year 2000, vol. 4067.

Japan Patent Office (JPO) Office Action mailed Nov. 19, 2009 for Japanese patent application No. 2006-501222.

Claims amendments filed in Japan Patent Office (JPO) on Feb. 9, 2010 for Japanese patent application No. 2006-501222.

Decision to Grant a Patent issued by Japan Patent Office (JPO) on Mar. 11, 2010 for Japanese patent application No. 2006-501222.

Zhou et al., "More Results on Restriction on Vector Spread-Out in 8x8 Partitioning Mode," Joint Video Team of ISO/IEC MPEG & ITU-T VCEG, p. 1-18, Oct. 9, 2002.

* cited by examiner

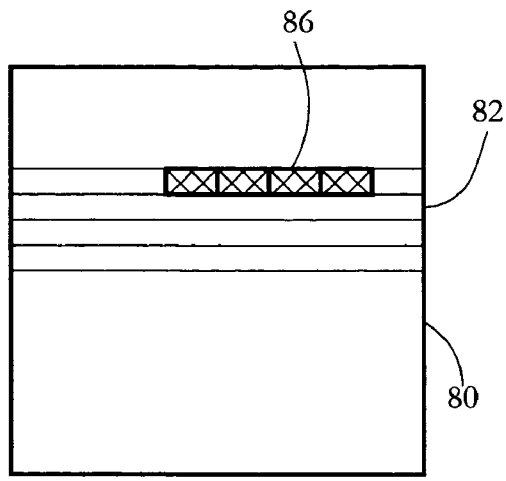
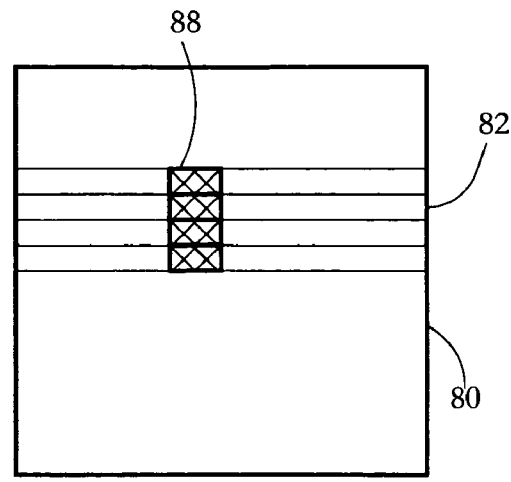
FIG. 3-A          FIG. 3-B
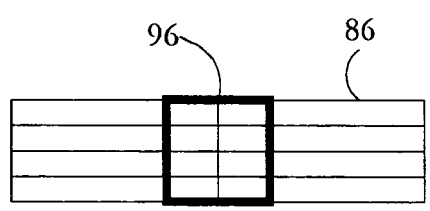
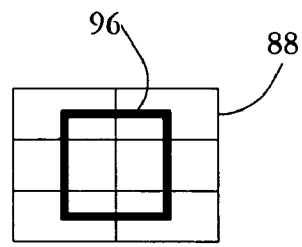
FIG. 4-A          FIG. 4-B
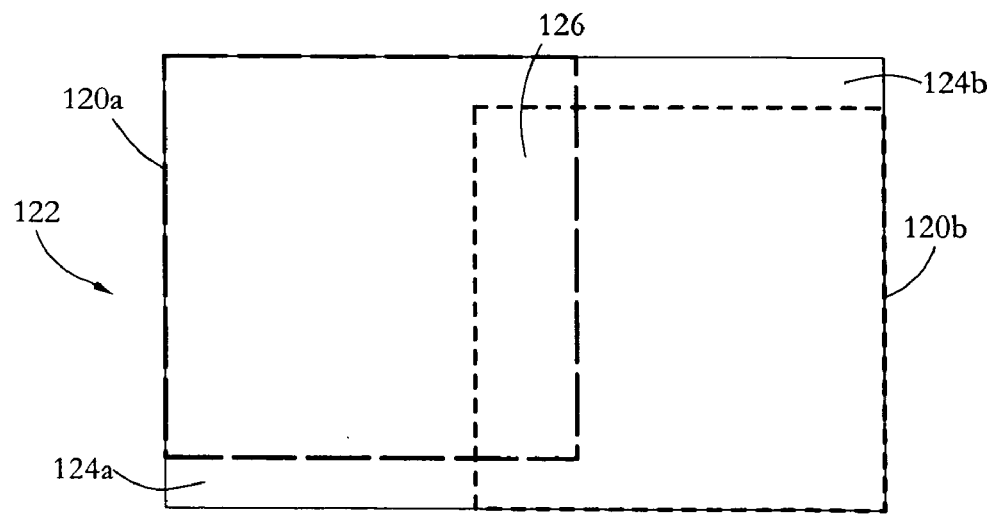
FIG. 5

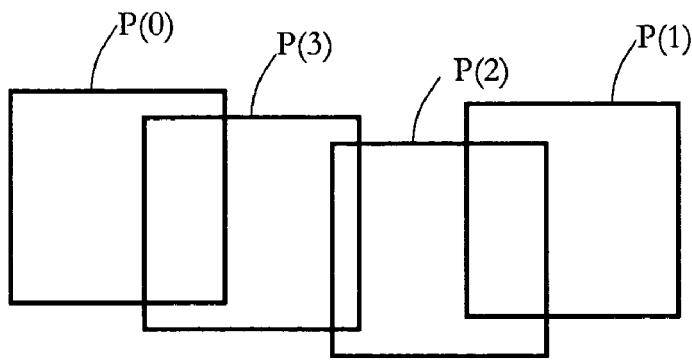
FIG. 6-A
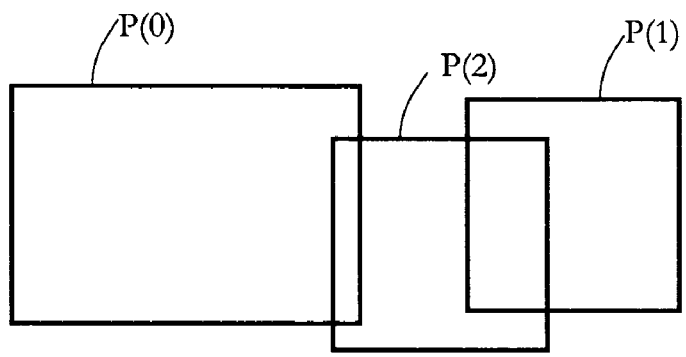
FIG. 6-B
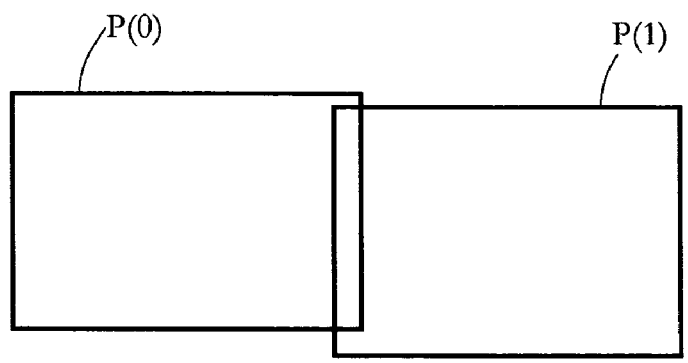
FIG. 6-C
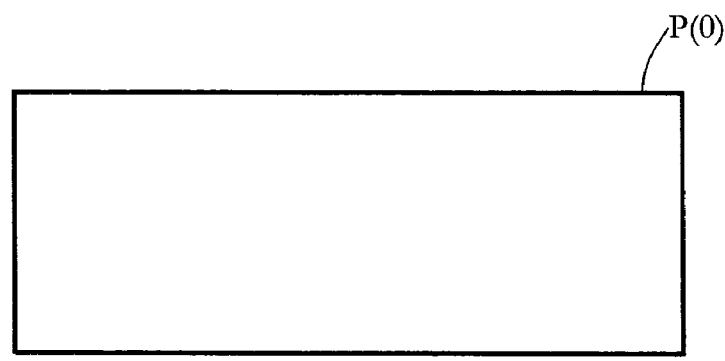
FIG. 6-D

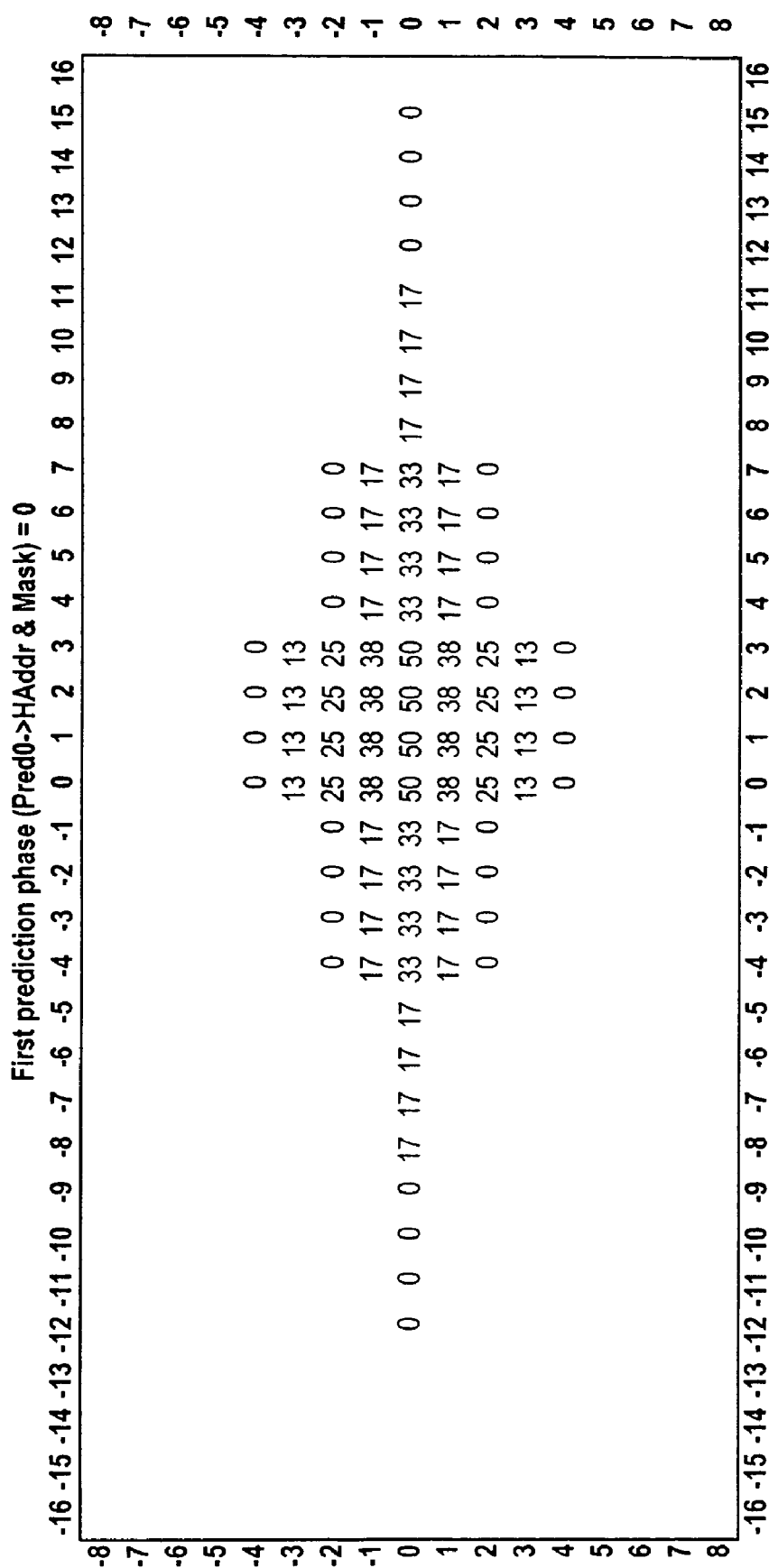
FIG. 7-A

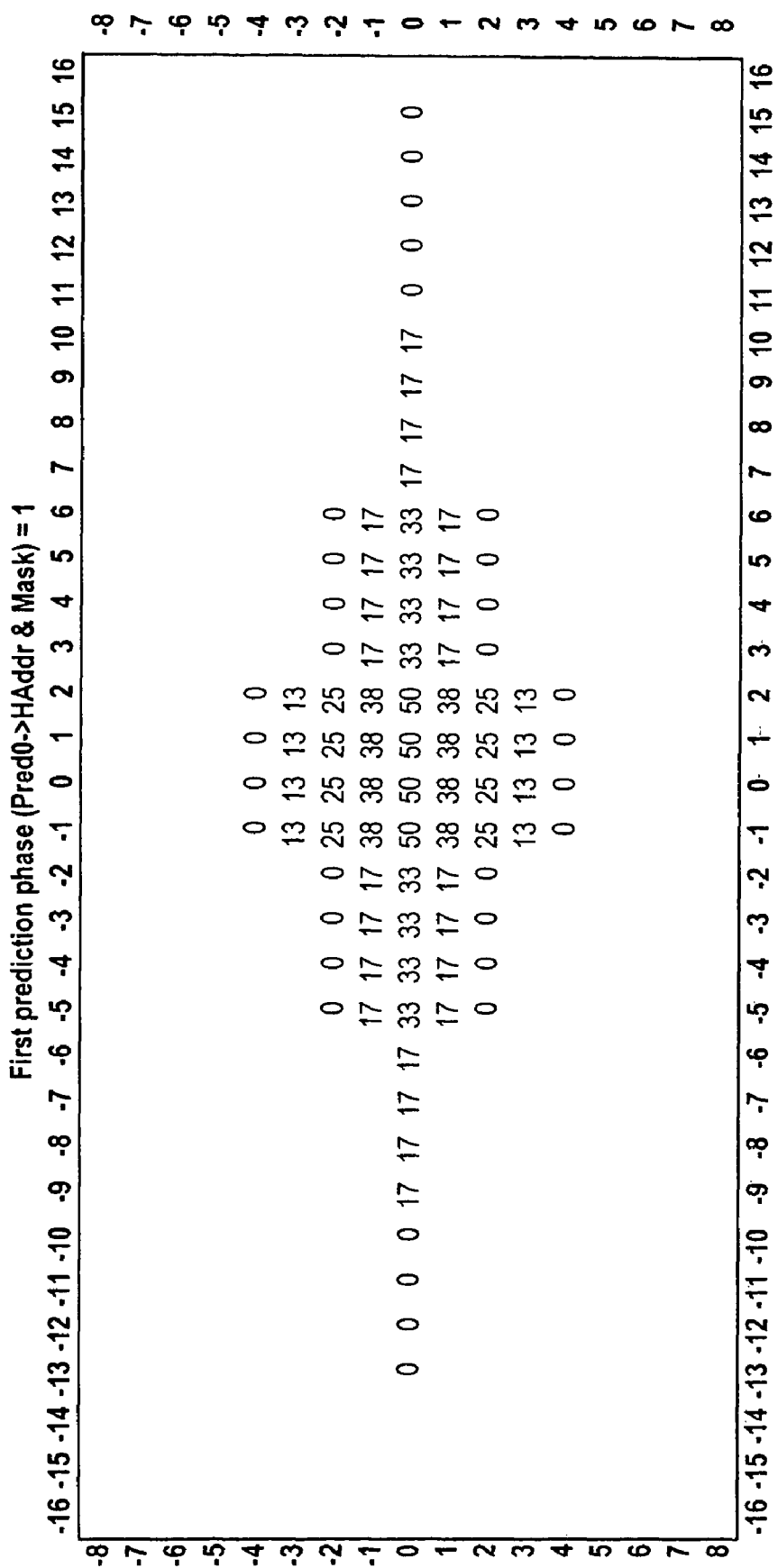
FIG. 7-B

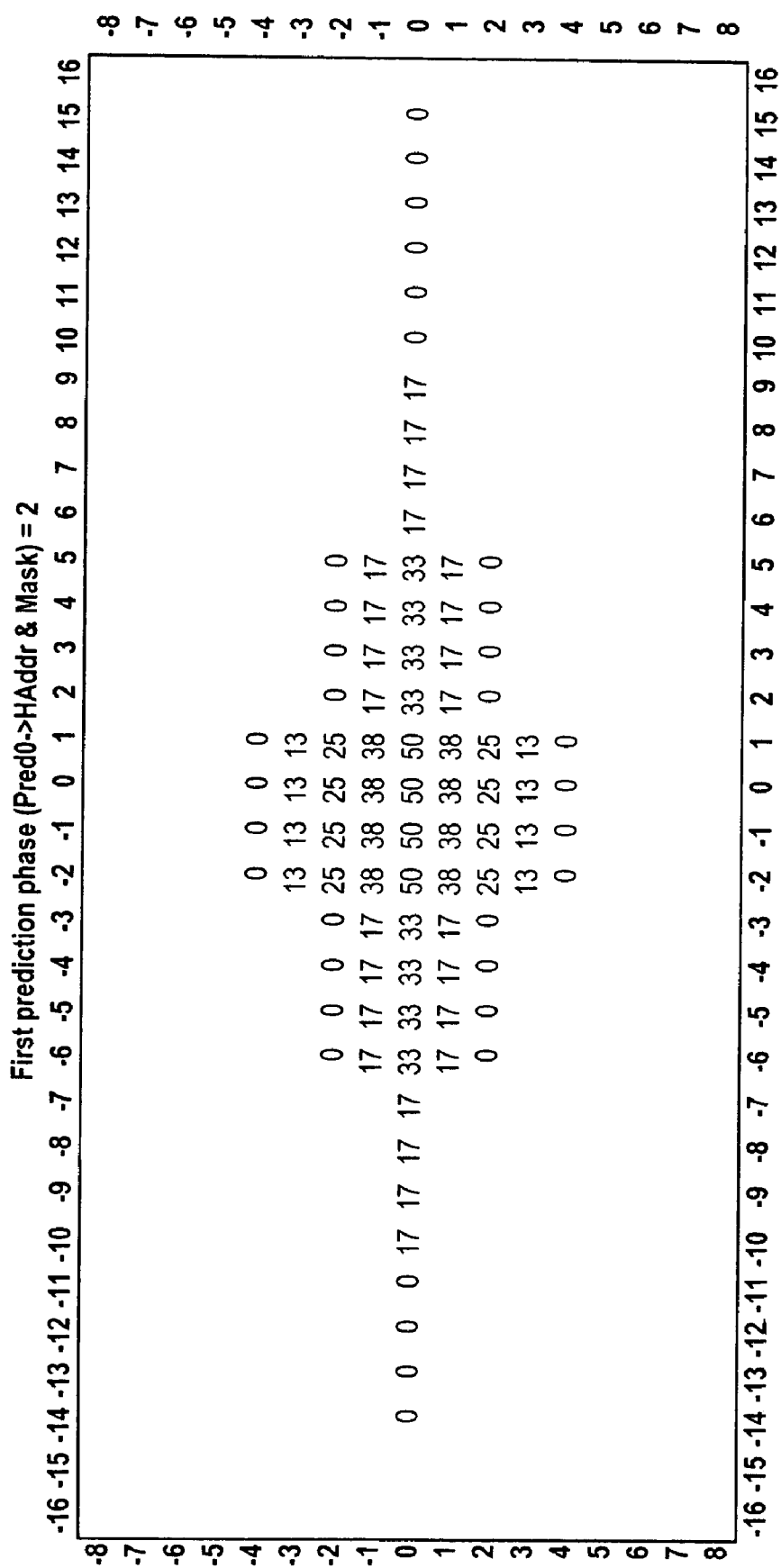
FIG. 7-C

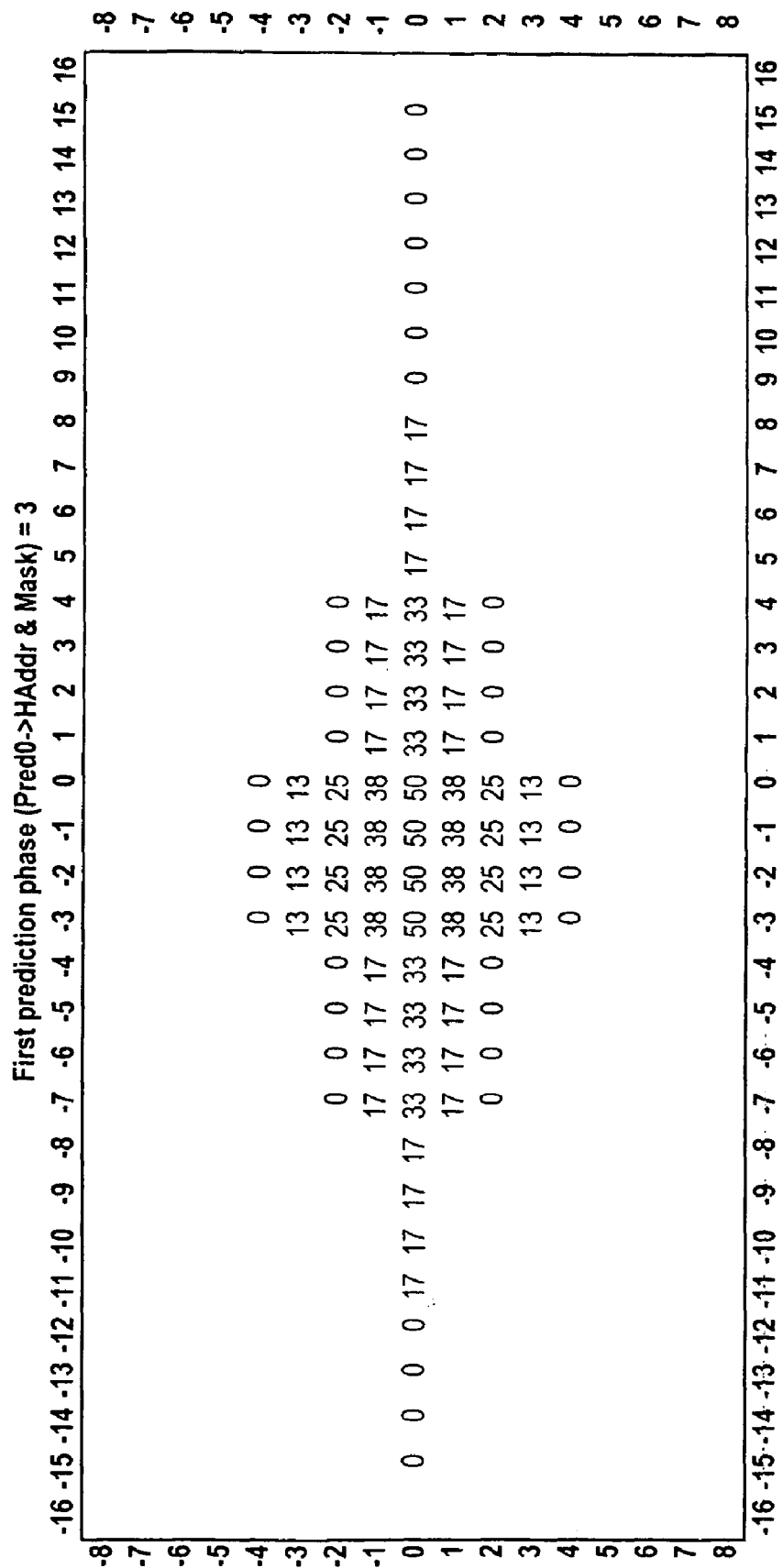
FIG. 7-D

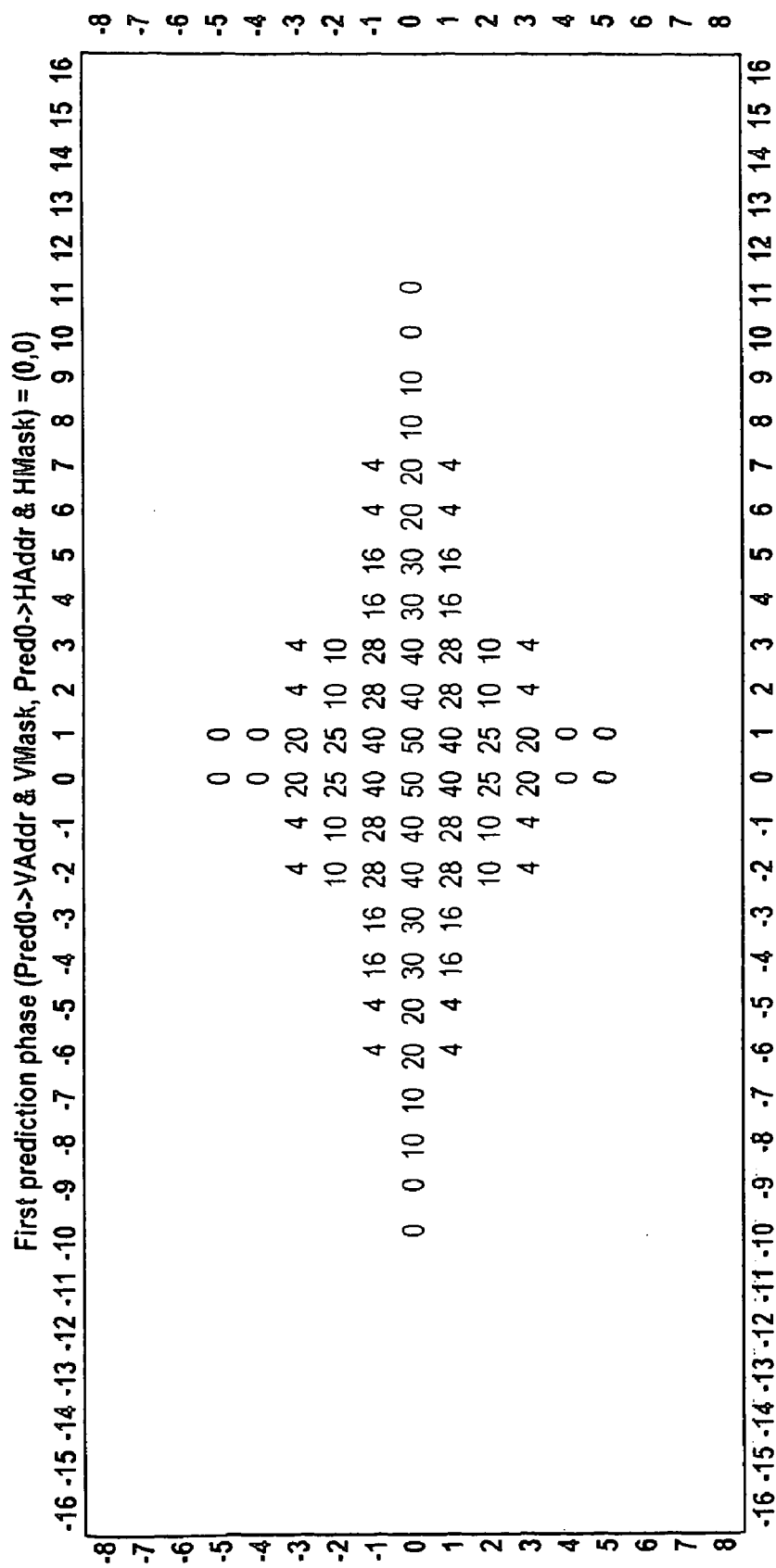
FIG. 8-A

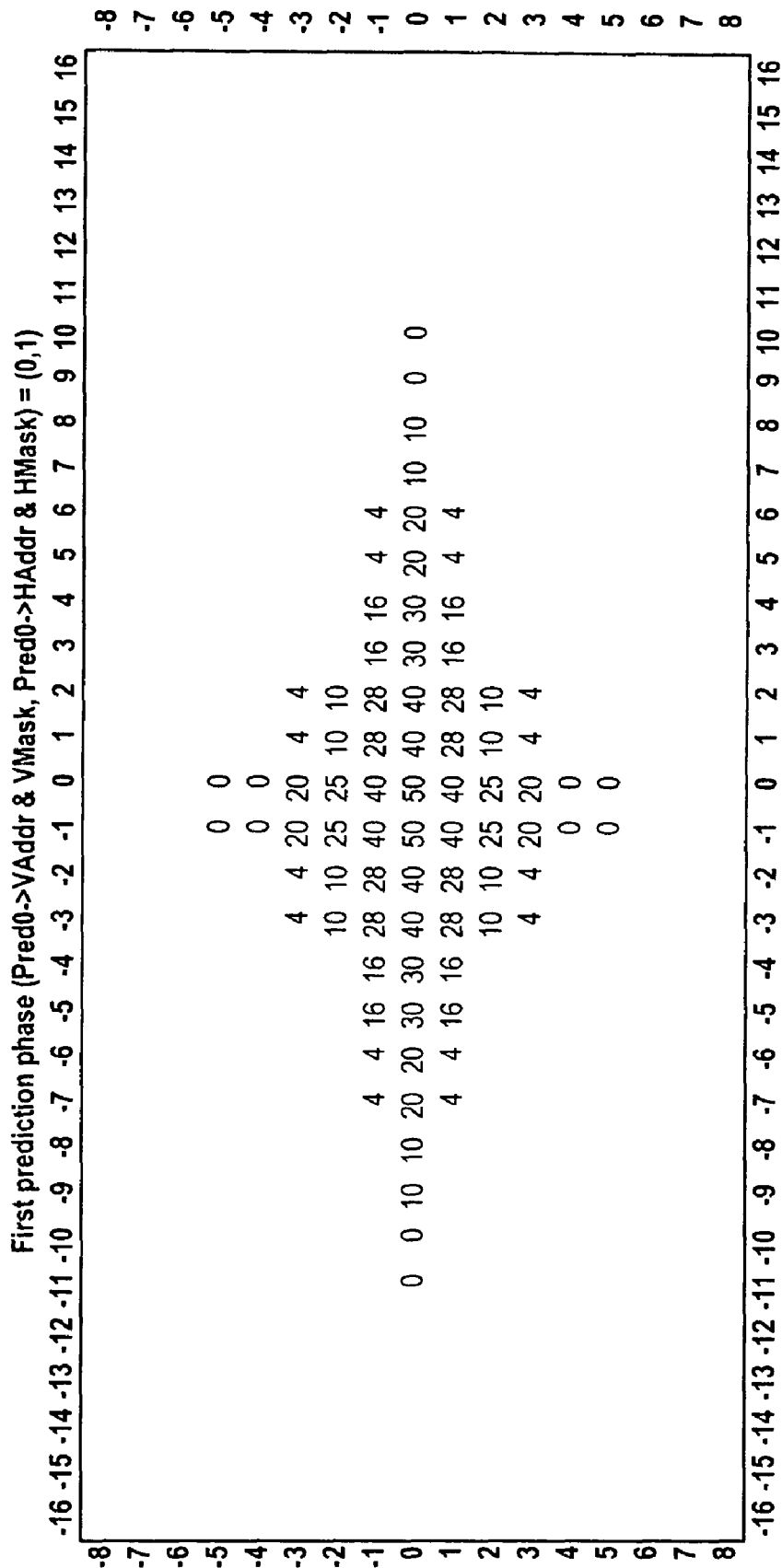
FIG. 8-B

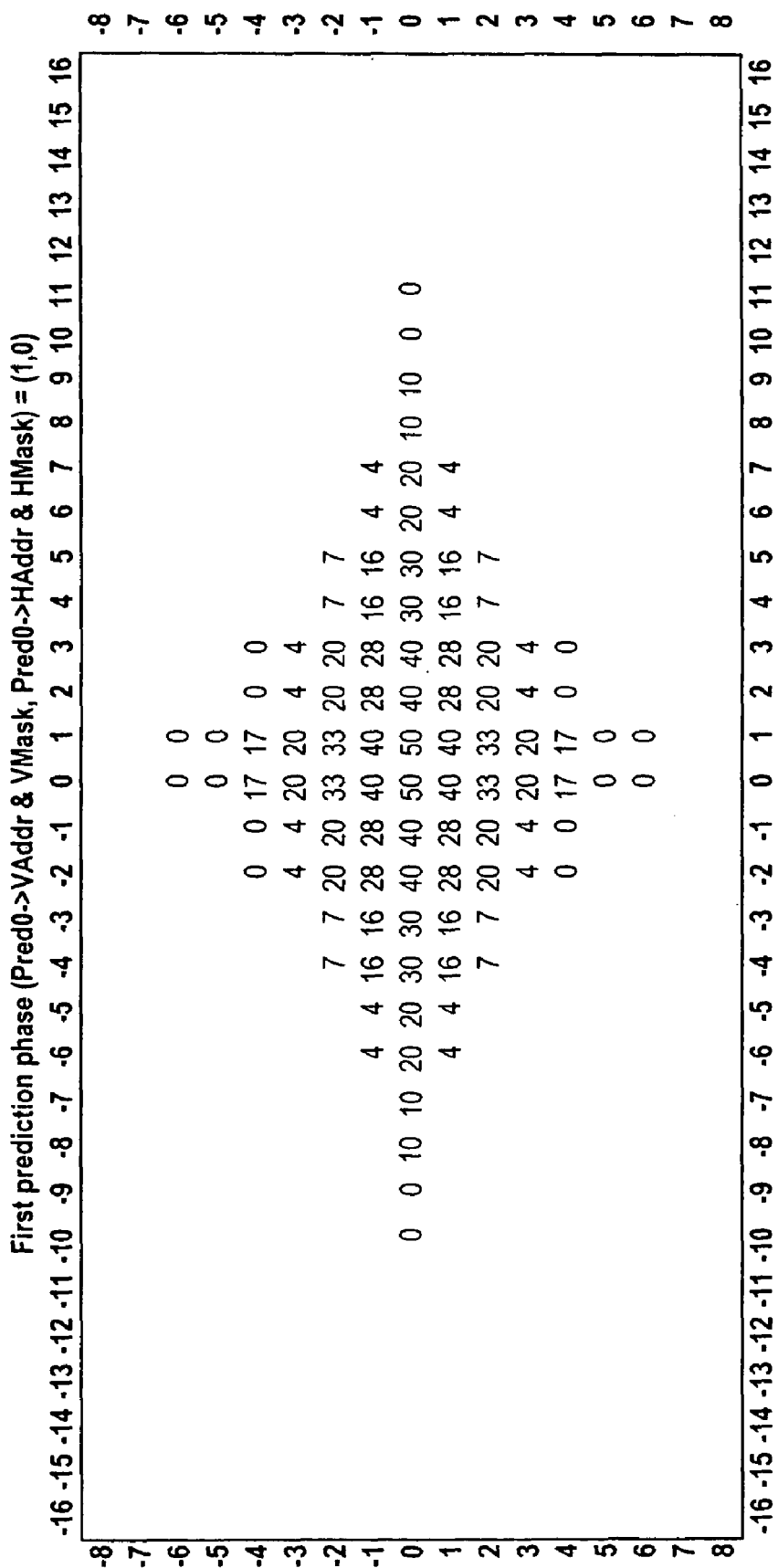
FIG. 8-C

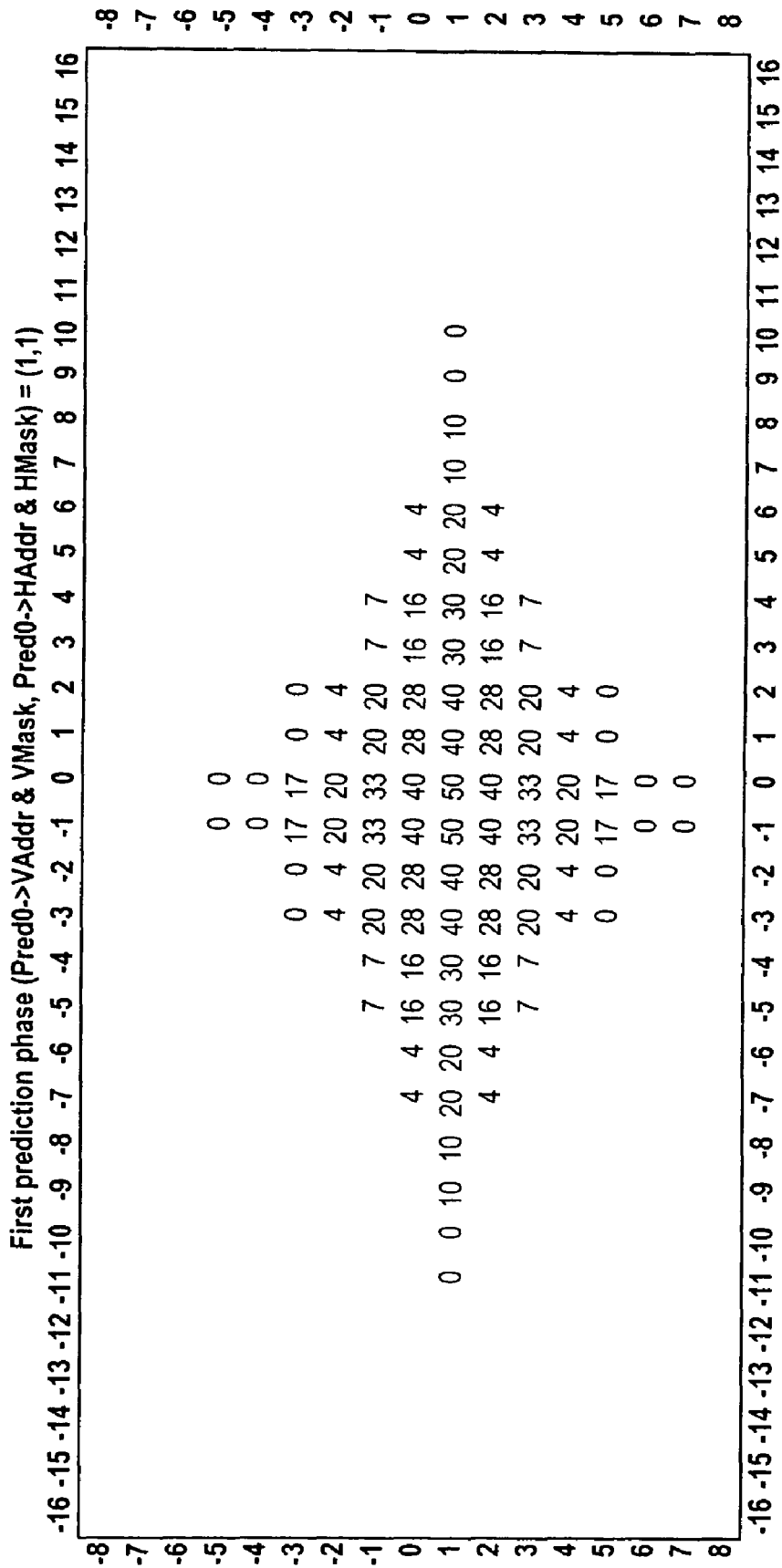
FIG. 8-D

MEMORY WORD ARRAY ORGANIZATION AND PREDICTION COMBINATION FOR MEMORY ACCESS

RELATED APPLICATION DATA

This application claims the benefit of the filing date of Provisional Patent Application No. 60/451,882, filed Mar. 3, 2003, entitled "Memory Word Array Organization and Prediction Combination for Memory Access," which is herein incorporated by reference. This application is related to U.S. patent application Ser. No. 10/215,705, filed Aug. 9, 2002, entitled "Random Access Memory Controller with Out of Order Execution," which is herein incorporated by reference.

COPYRIGHT NOTICE

This disclosure contains material, such as exemplary C-code, which is subject to copyright protection. The copyright owner, Mobilygen Corporation, has no objection to the facsimile reproduction by anyone of the patent disclosure as it appears in the Patent and Trademark Office patent file or records of any country, but otherwise reserves all rights whatsoever.

BACKGROUND

This invention relates to random access memories (RAM), and in particular to systems and methods for storing two-dimensional array data such as video images in RAM.

Emerging applications such as high-definition television (HDTV), which entail increasing resolutions and data transfer rates, pose new challenges to the design of real-time video coding systems. As processing power and memory capacity costs have steadily declined, memory bandwidth is becoming an increasingly important constraint on the performance and cost of video coding systems.

SUMMARY OF THE INVENTION

The present invention provides systems and methods allowing a reduction in the memory bandwidth required in video coding applications. According to a first aspect, the data assigned to each memory word is chosen to correspond to a 2D subarray of a larger array such as a macroblock. An array memory word organization allows reducing both the average and worst-case bandwidth required to retrieve predictions from memory in video coding applications, particularly for memory word sizes (memory bus widths) larger than the size of typical predictions. According to a second aspect, two or more 2D subarrays such as video predictions are retrieved from memory together as part of a larger 2D array, if retrieving the larger array requires fewer clock cycles than retrieving the subarrays individually. Allowing the combination of multiple predictions in one memory access operation can allow a reduction in the average bandwidth required to retrieve predictions from memory.

BRIEF DESCRIPTION OF THE DRAWINGS

The foregoing aspects and advantages of the present invention will become better understood upon reading the following detailed description and upon reference to the drawings where:

FIGS. 3-A-B illustrate schematically the difference between a conventional linear memory word organization and an array memory word organization, according to one aspect of the present invention.

FIGS. 4-A-B illustrate schematically the worst-case memory bandwidth savings achievable with an array memory word organization, for an exemplary 4×4-byte prediction and a 64 bit memory bus (8 byte memory word), according to an embodiment of the present invention.

FIG. 5 shows two individual predictions and a combined prediction resulting from combining the two individual predictions, according to one aspect of the present invention.

FIGS. 6-A-D illustrate a prediction arrangement in which three described prediction combination functions can yield different results, according to an embodiment of the present invention.

FIGS. 7-A-D show computed memory bandwidth savings, expressed as a percentage of total memory cycles, resulting from combining two 9×4 predictions for a 32-bit memory bus with a linear memory word organization.

FIGS. 8-A-D show computed memory bandwidth savings, expressed as a percentage of total memory cycles, resulting from combining two 9×4 predictions for a 32-bit memory bus with an array memory word organization.

DETAILED DESCRIPTION OF THE INVENTION

Figure 1:
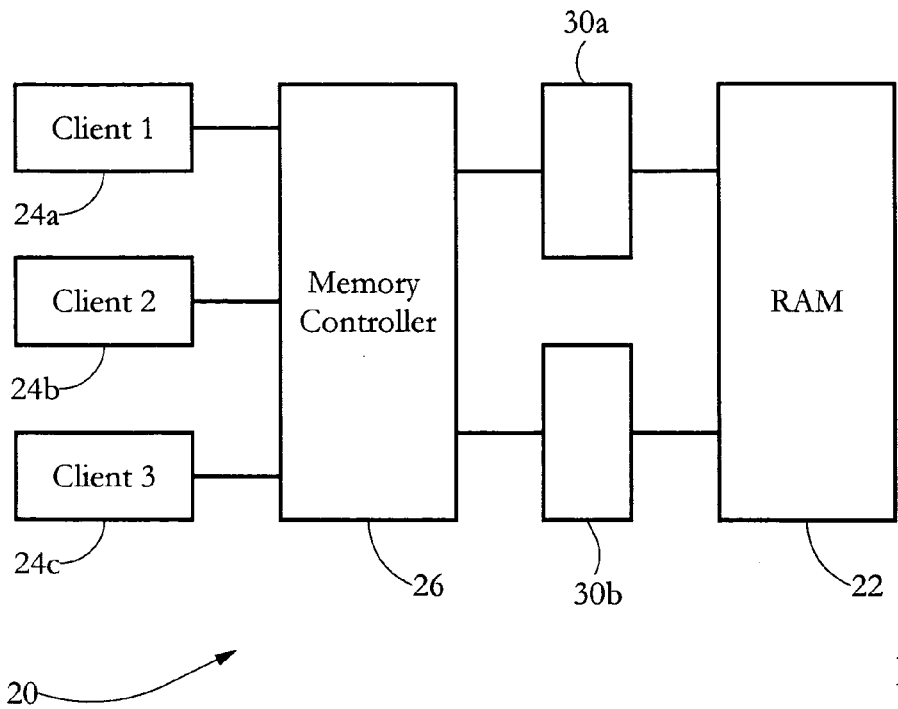
FIG. 1 is a high-level diagram of an exemplary data processing system according to an embodiment of the present invention.

In the following description, a pipestage is understood to be a circuit which includes a finite state machine (FSM). A core is understood to be a circuit including plural interconnected pipestages. A set of elements is understood to contain one or more elements. Any reference to an element is understood to encompass at least one element. Any described connection can be a direct connection or an indirect connection through intermediary structures/logic. Unless otherwise specified, the statement that a first request is derived from the second request is understood to mean either that the first request is equal to the second request, or that the first request is generated by processing the second request and (optionally) other data. Memory access operations can be memory read and/or write operations. The term "coding" encompasses both encoding and decoding. Unless otherwise specified, the term "rectangle" encompasses both symmetric rectangles (squares) and asymmetric rectangles. Unless otherwise specified, an N×M rectangle may be a rectangle having its horizontal or vertical dimension characterized by the number N.

The following description illustrates embodiments of the invention by way of example and not necessarily by way of limitation. For illustrative purposes, the following discussion focuses on exemplary video data encoding/decoding systems, and in particular on systems designed to operate according to the emerging H.264 (MPEG-4 Part 10) standard. Other hardware configurations than the one described below can be employed to implement systems and methods of the present invention. Moreover, the memory word organization and 2D array (e.g. prediction) combination schemes described below can be used with non-video multidimensional (e.g. 2D or 3D) data.

MPEG (Moving Pictures Experts Group) denotes a family of widely used video compression standards, including MPEG-1, MPEG-2 and MPEG-4. MPEG video coding (encoding and/or decoding) typically combines several approaches to video compression, including entropy coding, discrete cosine or Hadamard transform, quantization, and motion compensation. Motion compensation reduces the amount of data needed to store or transmit a video image sequence by exploiting the temporal redundancy of common video image sequences. In typical video sequences, an object or image block displayed in one video frame can be found in a subsequent frame at the same location or at a displaced location. Rather than encode the data corresponding to the image block a second time, an MPEG encoder can encode an instruction to use a block of data from a previous frame, a motion vector describing the difference in the block locations between the two frames, and residual data describing the differences between the image blocks at the two locations.

Such an image block from a previous image is commonly called a prediction. An image block 16×16-bytes in size is commonly called a macroblock. Generally, a macroblock may contain one or more predictions. Employing smaller predictions can allow a reduction in the amount of residual data, but at the same time require an increase in the amount of motion vector data encoded. An optimal prediction size for a particular part of an image displayed in two frames can depend on the similarities in the corresponding data between the two frames. Retrieving predictions from memory can account for a majority of the memory bandwidth used by an MPEG decoder.

MPEG video data includes three components: one luminance (luma) plane (Y) and two chrominance (chroma) planes (Cb and Cr). Chrominance data is typically sampled at half the resolution of luminance data. The two chrominance components use the same prediction, so a picture can be stored in memory in two planes: one for luma and one for chroma, with alternating bytes in memory assigned to Cb and Cr. Commonly, a prediction can be a block of 4×4, 4×8, 8×4, 8×8, 8×16, 16×8, or 16×16 luma samples plus two blocks of quarter size (half size horizontally and vertically) of chroma samples read from a reference picture. For simplicity, the following discussion focuses primarily on the luma plane. The described array memory word arrangements and prediction combination approach can be applied to chroma data as well.

Exemplary Hardware Environment for Video Encoding/Decoding Applications

FIG. 1 is schematic diagram of an exemplary data processing system 20 according to an embodiment of the present invention. Data processing system 20 includes a random access memory (RAM) such as a dynamic random access memory (DRAM) 22, a plurality of clients 24a-c, and a memory controller 26 connecting clients 24a-c and memory 22, for controlling memory 22 according to requests received from clients 24a-c. Exemplary formats for memory 22 include, without limitation, single-data rate SDRAM (SDR-SDRAM) and double-data rate SDRAM (DDR-I or DDR-II SDRAM). Memory 22 is connected to memory controller 26 through conventional command and data write/read signal drivers 30a-b, respectively. Signal drivers 30a-b are preferably memory pads with registers, and serve to ensure compliance with memory timing constraints. Clients 24a-c can be special-purpose hardware modules, as well as programmed general-purpose processors. Memory 22 can include a plurality of independently-addressable banks, each of which is organized as a plurality of pages (rows). A memory page is conventionally organized as a plurality of memory words, wherein each memory word contains a number of bits equal to the width of the memory data bus. Each memory word/location within a bank is characterized by a row (page) address and a column address. Writing or reading data to/from memory normally requires one clock cycle per memory word accessed.

Figure 2:
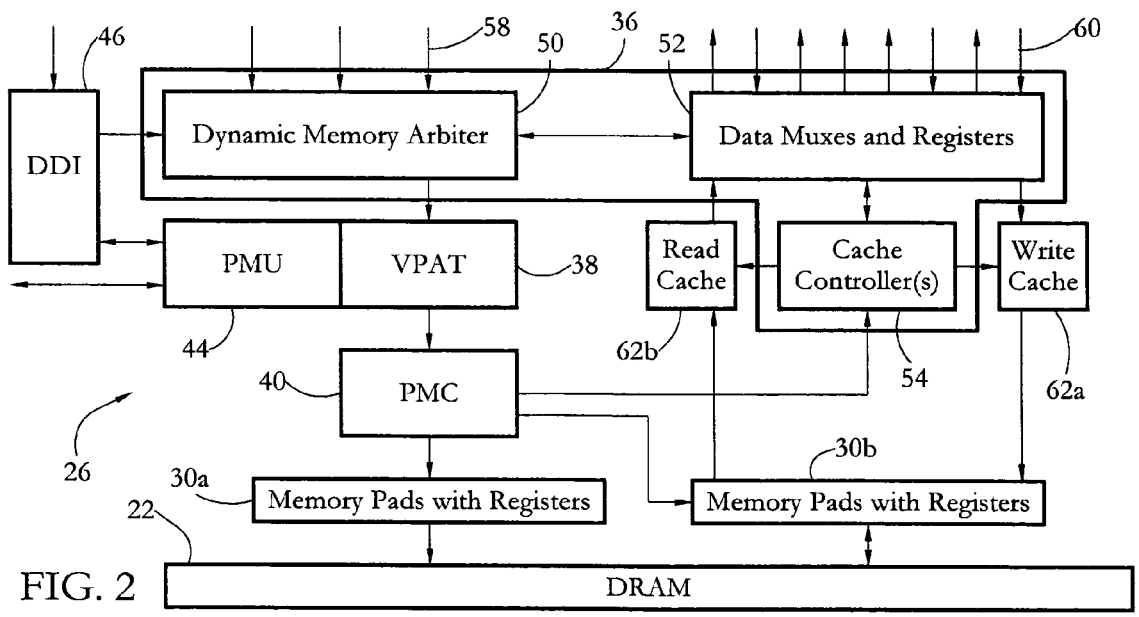
FIG. 2 shows an exemplary memory controller according to an embodiment of the present invention.

FIG. 2 shows a high-level schematic diagram of an exemplary memory controller 26 suitable for use in a video coding (encoding/decoding) system, according to an embodiment of the present invention. Memory controller 26 includes a client arbiter 36 capable of communication with plural clients, a virtual-to-physical address translation (VPAT) unit 38 connected to client arbiter 36, a physical memory controller (PMC) 40 connected to VPAT unit 38, and write and read caches 62a-b connected to memory 22 and client arbiter 36. Caches 62a-b provide buffering and reordering functions described below, and can be thought of as forming part of client arbiter 36. Memory controller 26 also includes a partition management unit (PMU) 44 connected to VPAT unit 38, and decode display interlock (DDI) unit 46 connected to client arbiter 36 and PMU 44. Memory controller 26 controls the operation of memory 22, as described in further detail below. DDI unit 46 performs decode/display interlocking, while PMU 44 is a central repository for information regarding memory partitions and any video/graphics frames stored in them.

In one embodiment, each unit of memory controller 26 may be a data-driven core capable of communication with other cores according to a ready/request handshake protocol. In one implementation, a token is transferred from a first core to a second core if and only if the first core asserts a ready signal to the second core, and the second core asserts a request signal to the first core on the same clock cycle (synchronously). For further information on such a ready/request protocol and core architecture see U.S. Pat. No. 6,145,073. Generally, the various units of memory controller 26 can be interconnected using other desired protocols/connections.

Client arbiter 36 comprises a dynamic memory arbiter 50, a data multiplexer/register unit 52 connected to dynamic memory arbiter 50, and a cache controller unit 54 connected to the multiplexer/register unit 52 and to caches 62a-b. Dynamic memory arbiter 36 is connected to multiple clients over corresponding client command connections 58, while multiplexer/register unit 52 is connected to the clients over corresponding data connections 60. Cache controller unit 54 controls the operation of read and write caches 62a-b in response to commands received from PMC 40 and client data received from unit 52. In particular, in one implementation, cache controller unit 54 is employed to implement the 2D-subarray memory word organization scheme described below, by reordering the data received and sent to/from caches 62a-b. Cache controller unit 54 may also be capable of reformatting the data sent to/from caches 62a-b to match the formats employed by memory 22 and various clients. For example, if the memory bus connecting caches 62a-b to memory 22 is 64-bit wide while a specific client bus is 16-bit wide, cache controller 54 may be capable of receiving 64-bit memory words from memory 22 and sending the data sequentially as 16-bit tokens to the corresponding client.

Client arbiter 36 receives memory access (read/write) requests from plural clients, and arbitrates the requests. Client arbiter 36 allows only one request at a time to proceed to VPAT unit 38, and attaches a client identification (ID) label to each request allowed to proceed. The client selection decision made by client arbiter 36 can be made according to a predetermined protocol, for example using a round-robin priority scheme. The client requests received by client arbiter 36 may have one of a plurality of virtual (client, logical) address formats, each corresponding to a mode of operation of memory controller 26. For example, modes such as linear, frame, field, and array can be useful for accessing stored video images. In linear mode, the client request includes a virtual (client) start address, a transaction length, and a transaction type (read/write). In frame mode, the client request can include start X and Y image coordinates, ΔX and ΔY image extents, and a transaction type. The field mode is similar to the frame mode, except that only every other line in the image is accessed. In array mode, the client request includes a virtual start address, a transaction length, a stride, and a period number N. Such a request corresponds to accessing a transaction length following the start address, then skipping a stride minus transaction length to arrive at a new start address, and then repeating the above process N times.

VPAT unit 38 receives one client request at a time from client arbiter 36, breaks each block request (e.g. frame, field or array mode request) into a set of linear requests, and translates any virtual addresses from the client requests into physical addresses to be sent to PMC 40. A physical address can be equal to, for example, the sum of a function of the received virtual address (e.g. f(X,Y), where X and Y are start image coordinates) and a base address for the corresponding client, wherein each client has a different base address. VPAT unit 38 sends the resulting linear requests to PMC 40. PMC 40 controls the operation of memory 22 according to the commands received from VPAT 38. An exemplary implementation for PMC 40 is described in detail in U.S. Pat. No. 7,093,094 entitled "Random Access Memory Controller with Out of Order Execution." Other physical memory controller designs suitable for use in the present invention are known in the art.

Data reordering logic and buffers used to implement the memory word array organization described below may be situated in various locations within a data processing system. In some embodiments, the memory word organization described below is implemented within client arbiter 36, and in particular within cache controller 54. The memory word organization may also be implemented situated within clients capable of operating on array words. The prediction combination approach described below may be implemented within any client that retrieves predictions from memory, such as clients implementing motion compensation functionality. Implementing the described memory word organization within memory controller 26 allows separating client design from memory parameters. In general, the memory word organization and prediction combination systems and methods described below could be implemented within a memory controller, clients connected to the memory controller, or other data processing modules.

Memory Word Array Organization

In conventional memory controllers, a memory word contains consecutive bytes from the same line in a 2D video image. Such a memory organization is referred to below as a linear memory word organization. For 8-, 16-, or 32-bit memory words and corresponding memory bus widths, the memory word size is normally smaller than the size of predictions commonly used in video data decoding. For such bus widths, reading a prediction from memory normally requires reading multiple words from memory. For 64-bit, 128-bit or larger memory words, the memory word size can be larger than the size of at least some predictions. At the same time, because in general a prediction may start at an arbitrary position within a memory word, reading a prediction from memory may require reading two words under a worst-case scenario, regardless of how wide the memory bus is. Thus, with a linear memory word organization, increasing the width of the memory bus may not provide sufficient memory bandwidth to allow worst-case prediction access in one memory access operation.

The bandwidth required for reading 2D predictions from memory can be reduced by assigning to each memory word a 2D rectangular subarray similar in shape and size to the predictions to be read. Table 1 lists preferred word organizations for several memory bus widths:

TABLE 1

| | Bus Width (bits) | | | | | | |
|---|---|---|---|---|---|---|---|
| | 8 | 16 | 32 | 64 | 128 | 256 | 512 |
| Word Organization (bytes) | 1 * 1 | 2 * 1 | 2 * 2 | 4 * 2 | 4 * 4 | 8 * 4 | 8 * 8 |

For a $(8 \times 2^n)$-bit bus width, each memory word is preferably assigned to an M×N image subarray, with $M=2^n/2^{n>>1}$, and $N=2^{n>>1}$. The notation n>>1 refers to right-shifting the binary representation of n by one bit, i.e. dividing n by 2 and rounding down. As Table 1 illustrates, a preferred subarray shape is square if the number of bytes in a word is an even power of two, and a 2:1 aspect-ratio rectangle if the number of bytes in a word is an odd power of two. Preferably, for asymmetric subarrays, the horizontal size is double that of the vertical size, although in general the vertical size can be chosen to be larger than the horizontal size. Having the horizontal size larger than or equal to the vertical size can allow the memory word shape to better match the shape of chroma data, and thus reduce the bandwidth required for reading chroma predictions.

FIGS. 3-A-B illustrate schematically the difference between a conventional linear memory word organization and an array memory word organization according to an embodiment of the present invention. The illustrations of FIGS. 3-A-B are not to scale. FIG. 3-A shows part of an image 80 including four image lines 82. A memory word is assigned to a linear image region 86 located along one of the lines 82. FIG. 3-B illustrates a corresponding rectangular 2D subarray 88 assigned to a memory word in an array memory word organization. Subarray 88 can span multiple display lines 82.

FIGS. 4-A-B illustrate schematically the worst-case memory bandwidth savings achievable with an array memory word organization, for an exemplary 4×4-byte prediction 96 and a 64 bit memory bus (8 byte memory word). FIG. 4-A shows that 8 linear memory words 86 must be retrieved from memory in order to reconstruct prediction 96 in a worst-case situation. As shown in FIG. 4-B, only 6 array memory words 88 need to be retrieved from memory to reconstruct 96 in a worst case situation. If the start of the prediction data were to coincide with the start of the memory words in the two arrangements, a linear word arrangement would require 4 clock cycles, while the array word arrangement would require only 2 clock cycles to retrieve prediction 96.

Combining 2D Arrays/Predictions

Further average memory bandwidth savings can be achieved by combining the retrieval of multiple 2D arrays such as predictions, as described below. The methods of combining predictions described below can be used with both linear and array memory word organizations. The prediction combination methods described below may be implemented using suitable logic situated within any motion compensation or other clients that need to retrieve predictions or other 2D array data from memory.

Consider an arbitrary 16×16-byte macroblock constrained to correspond to at most 32 predictions sized 4×4, 4×8, 8×4, 8×8, 8×16, 16×8, or 16×16 bytes. The predictions can come from one or two pictures, with at most 16 predictions from the same picture. A video encoder normally starts by finding a reasonable 16×16-byte prediction for the entire macroblock. The encoder then attempts to select an optimal prediction set within the limited time allowed to process the macroblock, for example by dividing the macroblock in several smaller blocks and evaluating different positions for the smaller blocks. Statistically, the positions of different predictions selected by such a process are highly correlated. About 50% of adjacent predictions overlap by at least a few pels. Many other adjacent predictions are a few pels or quarter pels apart. Thus, at least in some instances, memory bandwidth can be saved by reading from memory a combined prediction defined by the minimal image rectangle containing the two predictions, instead of reading the two predictions individually. Moreover, if the memory bus is wider than the memory space required to store data for one pixel (e.g. 1 byte), memory bandwidth can be saved by retrieving a combined prediction even if two adjacent predictions do not overlap, since retrieving the memory words required to reconstruct one prediction can require retrieving additional bits which form part of another prediction.

FIG. 5 shows a combined prediction 122 which can be read from memory instead of two individual predictions 120a-b. By retrieving the combined prediction 122 from memory, a prediction overlap area 126 is retrieved only once. Overlap area 126 would be retrieved from memory twice if predictions 120a-b were read individually. The memory bandwidth saved by retrieving overlap area 126 only once can be higher than the additional bandwidth needed to retrieve two unneeded areas 124a-b.

Table 2 shows exemplary C-code for a prediction combination function combine_prediction( ) suitable for combining two predictions according to a preferred embodiment of the present invention.

TABLE 2

```
bool combine_predictions (Pred *Pred0, Pred *Pred1)
{
  bool flag;
  int HAddr, VAddr, HSize, VSize;
  int Cycles, Cycles0, Cycles1;
// compute address and size of the combined prediction
  HAddr =    Pred0->HAddr < Pred1->HAddr ? Pred0->HAddr : Pred1->HAddr;
  VAddr =    Pred0->VAddr < Pred1->VAddr ? Pred0->VAddr : Pred1->VAddr;
  HSize =    (Pred0->HAddr + Pred0->HSize > Pred1->HAddr + Pred1->HSize ?
             Pred0->HAddr + Pred0->HSize : Pred1->HAddr + Pred1->HSize) - HAddr;
  VSize =    (Pred0->VAddr + Pred0->VSize > Pred1->VAddr + Pred1->VSize ?
             Pred0->VAddr + Pred0->VSize : Pred1->VAddr + Pred1->VSize) - VAddr;
// number of cycles needed to read the predictions
  Cycles  = cycles(        HAddr,           VAddr,         HSize,         VSize);
  Cycles0 = cycles(Pred0->HAddr,    Pred0->VAddr,  Pred0->HSize,  Pred0->VSize);
  Cycles1 = cycles(Pred1->HAddr,    Pred1->VAddr,  Pred1->HSize,  Pred1->VSize);
  if (Cycles <= Cycles0 + Cycles1)
  {
    flag = 1;                          // combine predictions
    Pred0->HOffset = Pred0->HAddr - HAddr;
    Pred0->VOffset = Pred0->VAddr - VAddr;
    Pred0->Haddr =              HAddr;
    Pred0->Vaddr =              VAddr;
    Pred1->HOffset = Pred1->HAddr - HAddr;
    Pred1->VOffset = Pred1->VAddr - VAddr;
    Pred1->Combine = Pred0;
  }
  else flag = 0;                       // do not combine predictions
  return (flag);
}
```

The combine_prediction( ) function takes as input two predictions and computes the address and size of the combined prediction. It returns a logical TRUE value when predictions should be combined, i.e. if memory bandwidth will be saved by combining the predictions. Predictions may be combined even when the combined prediction requires the same number of cycles as the two separate predictions, in order to allow achieving extra bandwidth savings as the procedure is applied iteratively to additional predictions.

The combine_prediction( ) function shown in Table 2 may make use of the data structures and memory organization constants defined in Table 3. The Pred stucture holds the prediction horizontal and vertical address, size, and offset, plus a Combine pointer to another Pred structure. The offsets are initialized with 0 and the Combine pointer with NULL. If the combine_prediction( ) function decides to combine the two predictions, it changes the Combine pointer of the second prediction to point to the first prediction, changes the horizontal and vertical address of the first prediction to the address of the combined prediction, and sets the horizontal and vertical offsets of both predictions to reflect the relative positions to the combined prediction. The cycles( ) macro computes the number of cycles needed to read a prediction. If Linear is defined, the macro computes the number of cycles assuming a linear word organization. The macro otherwise assumes an array word organization.

TABLE 3

```
int    N;                         // Number of predictions
Pred *Predictions[ ];             // array of pointers to predictions
typedef struct pred               // Prediction structure
{
  pred   *Combine;                // Pointer to Combined Prediction
                                  // if (Combine == NULL), prediction is not combined
  int    HAddr;                   // Horizontal Address (used only when Combined == NULL)
  int    VAddr;                   // Vertical Address (used only when Combined == NULL)
  int    HSize;                   // Horizontal Size
  int    VSize;                   // Vertical Size
  int    HOffset;                 // Horizontal Offset (shall be initialized with 0)
  int    VOffset;                 // Vertical Offset (shall be initialized with 0)
} Pred;
  int tmp;
  int Bytes,  MBits,  Mask;
  int HBytes, HMBits, HMask;
  int VBytes, VMBits, VMask;
// compute some memory organization constants
  Bytes = MWidth >> 3;            // number of Bytes in a memory word
  MBits = 0;                      // number of Bits needed to address Bytes
  tmp = Bytes;
  while (tmp >>= 1) MBits++;
  Mask = (1 << MBits) - 1;        // Bytes address Mask
// number of cycles needed to read a prediction
#ifdef Linear
  #define cycles(HAddr, VAddr, HSize, VSize) \
           (((HAddr & Mask) + HSize + Bytes - 1) >> MBits) * VSize;
#else     // Array
  VMBits = MBits >> 1;            // number of Bits needed to address VBytes
  HMBits = MBits - VMBits;        // number of Bits needed to address HBytes
  HBytes = 1 << HMBits;           // number of Horizontal Bytes in a memory word
  VBytes = 1 << VMBits;           // number of Vertical Bytes in a memory word
  HMask = (1 << HMBits) - 1;      // HBytes address Mask
  VMask = (1 << VMBits) - 1;      // VBytes address Mask
  #define Cycles(HAddr, VAddr, HSize, VSize) \
           (((HAddr & HMask) + HSize + HBytes - 1) >> HMBits) * \
           (((VAddr & VMask) + VSize + VBytes - 1) >> VMBits);
#endif
```

Table 4 shows exemplary C-code for three methods of combining multiple predictions using the combine_prediction( ) function of Table 2. The combine_exhaustive( ) function performs an exhaustive search of all possible ways in which predictions can be combined to save memory bandwidth. The combine_fast( ) function attempts all possible combinations for a first prediction, and then repeats the process for all other higher-indexed predictions, but not lower-indexed predictions. The combine_fast( ) function is faster than the combine_exhaustive( ) function, and yields the same results most of the time. The combine_one-pass( ) function performs a fast one-pass comparison that is often almost as good as the exhaustive search.

TABLE 4

```
void combine_exhaustive (void)
{
  bool flag;
  int i, j;
  for (i = 0 ; i < N ; i++)
  {
    if (Predictions[i]->Combine == NULL) {
      do {
        flag = 0;
        for (j = i+1 ; j < N ; j++)
        {
          if (Predictions[j]->Combine == NULL) {
            if (combine_predictions(Predictions[i], Predictions[j]))
              flag = 1;
          }
        }
      } while (flag);
    }
  }
}
```

TABLE 4-continued

```
}
void combine_fast (void)
{
  int i, j;
  for (i = 0 ; i < N ; i++)
  {
    if (Predictions[i]->Combine == NULL) {
      for (j = i+1 ; j < N ; j++)
      {
        if (Predictions[j]->Combine == NULL) {
          combine_predictions(Predictions[i], Predictions[j]);
        }
      }
    }
  }
}
void combine_onepass (void)
{
  int i;
  for (i = 1 ; i < N ; i++)
  {
    combine_predictions(Predictions[0], Predictions[i]);
  }
}
```

FIGS. 6-A-D illustrate a prediction arrangement in which the functions of Table 4 can lead to different final results. FIG. 6-A shows an arrangement of four adjacent, overlapping predictions P(0-3) arranged in the order 0, 3, 2, 1. The index assigned to each prediction can be arbitrary. FIG. 6-B shows the prediction configuration produced by the function combine_onepass( ). The function checks but does not combine P(0) and P(1), and P(0) and P(2). The function then combines P(0) and P(3) and names the result P(0). FIG. 6-C shows the prediction configuration produced by the function combine_fast( ). The function combine_fast( ) performs the operations performed by combine_onepass( ), and additionally it checks P(1) and P(2) and combines them into P(1). FIG. 6-D shows the prediction configuration produced by the function combine_exhaustive( ). The function first combines P(0) and P(3) into P(0), then P(0) and P(2) (again into P(0)), and finally P(0) and P(1).

Performance Improvements and Applications

The discussion below is intended to illustrate several aspects and applications of the invention according to some embodiments, and is not intended to limit the invention. The emerging H.264 (MPEG4-Part 10) standard endeavors to address the growing need for higher compression of moving pictures for various applications such as videoconferencing, digital storage media, television broadcasting, Internet streaming, and other communications. Next-generation video coding approaches will ideally enable the use of coded video representations in a flexible manner for a wide variety of network environments. Such approaches will allow motion video to be manipulated as a form of computer data, stored on various storage media, transmitted and received over existing and future networks, and distributed on existing and future broadcasting channels. Applications employing such a standard include, without limitation, cable TV (CATV), direct broadcast satellite video services (DBS), digital subscriber line video services (DSL), digital terrestrial television broadcasting (DTTB), interactive storage media such as optical disks (ISM), multimedia mailing (MMM), multimedia services over packet networks (MSPN), real-time conversational services such as videoconferencing (RTC), remote video surveillance (RVS), and serial storage media (SSM).

A proposed H.264 specification defines a plurality of levels listed in Table 5. A level is characterized by a specified set of constraints imposed on values of the syntax elements in the bitstream. The constraints may limit bitstream parameter values or arithmetic combinations of parameter values (e.g. frame width multiplied by frame height multiplied by frame rate).

Level 1 corresponds to the Quarter Common Interchange Format (QCIF, or 176×144@15), Level 2 to the Common Interchange Format (CIF, 352×288@30), Level 3 to Standard Definition (SD, 720×480@30 or 720×576@25), Level 3.2 to 720p High Definition (1280×720@60), and Level 4 to 1080i HD (1920×1080@30). The second column in Table 1 lists the number of 16×16 macroblocks per second to be processed, which is a direct measure of the computational complexity required for a given level. The sum of columns 3, 4, and 6 in Table 5 provides an approximate measure of the memory requirements of each level.

Up to level 2.2, each macroblock can have up to 32 predictions. A prediction can be a 4×4, 4×8, 8×4, 8×8, 8×16, 16×8, or 16×16 block of luma samples, plus two blocks of quarter size (half size both horizontally and vertically) chroma samples read from a reference picture. The prediction can be positioned almost anywhere in the reference picture in increments of ¼ luma samples both horizontally and vertically. Level 3 limits the number of predictions to a maximum average over the picture of 16 per macroblock. Above Level 3, the number of predictions is limited to a maximum average of 8 per macroblock. When the position of the prediction falls between pels in a particular direction (horizontal or vertical), five more luma samples (one for chroma) are needed on that direction to compute the final luma (chroma) prediction based on a 6-tap (2-tap for chroma) filter. For an N×M luma prediction, the probability is $1/16$ to read an N×M block, $3/16$ to read a N×(M+5) block, $3/16$ to read a (N+5)×M block, and $9/16$ to read a (N+5)×(M+5) block.

Table 6 provides a comparison of the worst-case number of cycles needed to retrieve a luma prediction for various prediction and memory word sizes, for an exemplary conventional linear memory word architecture and an array memory word architecture with the memory word organization of Table 1. Most of the prediction bandwidth is normally taken up by luma data, so Table 6 provides a good measure of the performance improvement achievable with an array word organization. The letters H and V denote horizontal and vertical prediction size, respectively. The columns in Table 3 correspond to different memory bus widths (memory word sizes) ranging from 8 bits to 512 bits. The last (TOTAL) line in the table assumes an equal (unweighted) distribution of prediction sizes.

TABLE 5

| Level # | Max Sample Processing Rate MaxMBPS (MB/s) | Max Frame Size MaxFS (MBs) | Decoded picture buffer memory MaxKByte (1024 bytes) | Max Video Bit Rate (1000 bits/sec) | Max CPB Size (1000 bits) | Vertical MV Range (full samples) | Min Compress ratio MinCR | Max number of MVs per two consecutive MBs |
|---|---|---|---|---|---|---|---|---|
| 1 | 1 485 | 99 | 148.5 | 64 | 175 | [−64, +63.75] | 2 | — |
| 1.1 | 3 000 | 396 | 337.5 | 192 | 500 | [−128, +127.75] | 2 | — |
| 1.2 | 6 000 | 396 | 891.0 | 384 | 1 000 | [−128, +127.75] | 2 | — |
| 1.3 | 11 880 | 396 | 891.0 | 768 | 2 000 | [−128, +127.75] | 2 | — |
| 2 | 11 880 | 396 | 891.0 | 2 000 | 2 000 | [−128, +127.75] | 2 | — |
| 2.1 | 19 800 | 792 | 1 782.0 | 4 000 | 4 000 | [−256, +255.75] | 2 | — |
| 2.2 | 20 250 | 1 620 | 3 037.5 | 4 000 | 4 000 | [−256, +255.75] | 2 | — |
| 3 | 40 500 | 1 620 | 3 037.5 | 10 000 | 10 000 | [−256, +255.75] | 2 | 32 |
| 3.1 | 108 000 | 3 600 | 6 750.0 | 14 000 | 14 000 | [−512, +511.75] | 4 | 16 |
| 3.2 | 216 000 | 5 120 | 7 680.0 | 20 000 | 20 000 | [−512, +511.75] | 4 | 16 |
| 4 | 245 760 | 8 192 | 12 288.0 | 20 000 | 25 000 | [−512, +511.75] | 4 | 16 |
| 4.1 | 245 760 | 8 192 | 12 288.0 | 50 000 | 62 500 | [−512, +511.75] | 2 | 16 |
| 5 | 552 960 | 21 696 | 40 680.0 | 135 000 | 135 000 | [−512, +511.75] | 2 | 16 |
| 5.1 | 983 040 | 36 864 | 69 120.0 | 240 000 | 240 000 | [−512, +511.75] | 2 | 16 |

TABLE 6

| Prediction | | 8 | | | 16 | | | 32 | | | 64 | | |
|---|---|---|---|---|---|---|---|---|---|---|---|---|---|
| H | V | Linear | Array | Saved | Linear | Array | Saved | Linear | Array | Saved | Linear | Array | Saved |
| 4 | 4 | 16 | 16 | 0% | 12 | 12 | 0% | 8 | 9 | -13% | 8 | 6 | 25% |
| 4 | 9 | 36 | 36 | 0% | 27 | 27 | 0% | 18 | 15 | 17% | 18 | 10 | 44% |
| 9 | 4 | 36 | 36 | 0% | 20 | 20 | 0% | 12 | 15 | -25% | 8 | 9 | -13% |
| 9 | 9 | 81 | 81 | 0% | 45 | 45 | 0% | 27 | 25 | 7% | 18 | 15 | 17% |
| 4 | 8 | 32 | 32 | 0% | 24 | 24 | 0% | 16 | 15 | 6% | 16 | 10 | 38% |
| 4 | 13 | 52 | 52 | 0% | 39 | 39 | 0% | 26 | 21 | 19% | 26 | 14 | 46% |
| 9 | 8 | 72 | 72 | 0% | 40 | 40 | 0% | 24 | 25 | -4% | 16 | 15 | 6% |
| 9 | 13 | 117 | 117 | 0% | 65 | 65 | 0% | 39 | 35 | 10% | 26 | 21 | 19% |
| 8 | 4 | 32 | 32 | 0% | 20 | 20 | 0% | 12 | 15 | -25% | 8 | 9 | -13% |
| 8 | 9 | 72 | 72 | 0% | 45 | 45 | 0% | 27 | 25 | 7% | 18 | 15 | 17% |
| 13 | 4 | 52 | 52 | 0% | 28 | 28 | 0% | 16 | 21 | -31% | 12 | 12 | 0% |
| 13 | 9 | 117 | 117 | 0% | 63 | 63 | 0% | 36 | 35 | 3% | 27 | 20 | 26% |
| 8 | 8 | 64 | 64 | 0% | 40 | 40 | 0% | 24 | 25 | -4% | 16 | 15 | 6% |
| 8 | 13 | 104 | 104 | 0% | 65 | 65 | 0% | 39 | 35 | 10% | 26 | 21 | 19% |
| 13 | 8 | 104 | 104 | 0% | 56 | 56 | 0% | 32 | 35 | -9% | 24 | 20 | 17% |
| 13 | 13 | 169 | 169 | 0% | 91 | 91 | 0% | 52 | 49 | 6% | 39 | 28 | 28% |
| 8 | 16 | 128 | 128 | 0% | 80 | 80 | 0% | 48 | 45 | 6% | 32 | 27 | 16% |
| 8 | 21 | 168 | 168 | 0% | 105 | 105 | 0% | 63 | 55 | 13% | 42 | 33 | 21% |
| 13 | 16 | 208 | 208 | 0% | 112 | 112 | 0% | 64 | 63 | 2% | 48 | 36 | 25% |
| 13 | 21 | 273 | 273 | 0% | 147 | 147 | 0% | 84 | 77 | 8% | 63 | 44 | 30% |
| 16 | 8 | 128 | 128 | 0% | 72 | 72 | 0% | 40 | 45 | -13% | 24 | 25 | -4% |
| 16 | 13 | 208 | 208 | 0% | 117 | 117 | 0% | 65 | 63 | 3% | 39 | 35 | 10% |
| 21 | 8 | 168 | 168 | 0% | 88 | 88 | 0% | 48 | 55 | -15% | 32 | 30 | 6% |
| 21 | 13 | 273 | 273 | 0% | 143 | 143 | 0% | 78 | 77 | 1% | 52 | 42 | 19% |
| 16 | 16 | 256 | 256 | 0% | 144 | 144 | 0% | 80 | 81 | -1% | 48 | 45 | 6% |
| 16 | 21 | 336 | 336 | 0% | 189 | 189 | 0% | 105 | 99 | 6% | 63 | 55 | 13% |
| 21 | 16 | 336 | 336 | 0% | 176 | 176 | 0% | 96 | 99 | -3% | 64 | 54 | 16% |
| 21 | 21 | 441 | 441 | 0% | 231 | 231 | 0% | 126 | 121 | 4% | 84 | 66 | 21% |
| TOTAL | | 19751 | 19751 | 0% | 10778 | 10778 | 0% | 6111 | 5884 | 4% | 4241 | 3338 | 21% |

| Prediction | | 128 | | | 256 | | | 512 | | |
|---|---|---|---|---|---|---|---|---|---|---|
| H | V | Linear | Array | Saved | Linear | Array | Saved | Linear | Array | Saved |
| 4 | 4 | 8 | 4 | 50% | 8 | 4 | 50% | 8 | 4 | 50% |
| 4 | 9 | 18 | 6 | 67% | 18 | 6 | 67% | 18 | 4 | 78% |
| 9 | 4 | 8 | 6 | 25% | 8 | 4 | 50% | 8 | 4 | 50% |
| 9 | 9 | 18 | 9 | 50% | 18 | 6 | 67% | 18 | 4 | 78% |
| 4 | 8 | 16 | 6 | 63% | 16 | 6 | 63% | 16 | 4 | 75% |
| 4 | 13 | 26 | 8 | 69% | 26 | 8 | 69% | 26 | 6 | 77% |
| 9 | 8 | 16 | 9 | 44% | 16 | 6 | 63% | 16 | 4 | 75% |
| 9 | 13 | 26 | 12 | 54% | 26 | 8 | 69% | 26 | 6 | 77% |
| 8 | 4 | 8 | 6 | 25% | 8 | 4 | 50% | 8 | 4 | 50% |
| 8 | 9 | 18 | 9 | 50% | 18 | 6 | 67% | 18 | 4 | 78% |
| 13 | 4 | 8 | 8 | 0% | 8 | 6 | 25% | 8 | 6 | 25% |
| 13 | 9 | 18 | 12 | 33% | 18 | 9 | 50% | 18 | 6 | 67% |
| 8 | 8 | 16 | 9 | 44% | 16 | 6 | 63% | 16 | 4 | 75% |
| 8 | 13 | 26 | 12 | 54% | 26 | 8 | 69% | 26 | 6 | 77% |
| 13 | 8 | 16 | 12 | 25% | 16 | 9 | 44% | 16 | 6 | 63% |
| 13 | 13 | 26 | 16 | 38% | 26 | 12 | 54% | 26 | 9 | 65% |
| 8 | 16 | 32 | 15 | 53% | 32 | 10 | 69% | 32 | 6 | 81% |
| 8 | 21 | 42 | 18 | 57% | 42 | 12 | 71% | 42 | 8 | 81% |
| 13 | 16 | 32 | 20 | 38% | 32 | 15 | 53% | 32 | 9 | 72% |
| 13 | 21 | 42 | 24 | 43% | 42 | 18 | 57% | 42 | 12 | 71% |
| 16 | 8 | 16 | 15 | 6% | 16 | 9 | 44% | 16 | 6 | 63% |
| 16 | 13 | 26 | 20 | 23% | 26 | 12 | 54% | 26 | 9 | 65% |
| 21 | 8 | 24 | 18 | 25% | 16 | 12 | 25% | 16 | 8 | 50% |
| 21 | 13 | 39 | 24 | 38% | 26 | 16 | 38% | 26 | 12 | 54% |
| 16 | 16 | 32 | 25 | 22% | 32 | 15 | 53% | 32 | 9 | 72% |
| 16 | 21 | 42 | 30 | 29% | 42 | 18 | 57% | 42 | 12 | 71% |
| 21 | 16 | 48 | 30 | 38% | 32 | 20 | 38% | 32 | 12 | 63% |
| 21 | 21 | 63 | 36 | 43% | 42 | 24 | 43% | 42 | 16 | 62% |
| TOTAL | | 3266 | 1895 | 42% | 2888 | 1317 | 54% | 2888 | 916 | 68% |

Table 6 shows that, for a memory word organization such as the one in Table 1, an array architecture allows achieving significant memory bandwidth savings for memory bus widths of 64 bits and higher. The entry on the first line in Table 6 (H=4, V=4) in the 64-bit word size column corresponds to the arrangement of FIGS. 4-A-B.

Table 7 lists computed worst-case maximum bandwidth requirements, in Mbytes/sec, for an H.264 decoder at different levels and memory bus widths, for linear and array memory word organizations. Table 7 also lists the corresponding maximum memory clock speed required for a DDR-SDRAM memory. The physical DDR memory bus width is half of the width used in computing the bandwidth requirements, as both edges of the clock are used to transfer data, and data is always transferred in pairs. The worst-case bandwidth required for bit-buffer write, bit-buffer read, deblocking read, pixel write, and display operations is almost independent of the memory bus width and whether the memory word organization is linear or array-based. The prediction bandwidth, which depends on whether the memory word organization is linear or array-based, constitutes the bulk of the required bandwidth. Depending on the level and memory organization, 53% to 97% of the memory bandwidth required by an H.264 decoder can be required to read temporal predictions. The suffix L following the listed width values represents a linear memory word organization, while the suffix A denotes an array memory word organization.

TABLE 7

|  |  | H.264 Levels |  |  |  |  |  |  |
|---|---|---|---|---|---|---|---|---|
|  | Width | 1 (QSIF) | 1.1 | 1.2 | 1.3 | 2 (SIF) | 2.1 | 2.2 |
| Max. Bit-Rate [Mbits/sec] |  | 0.064 | 0.192 | 0.384 | 0.768 | 2.000 | 4.000 | 4.000 |
| Max. Macroblocks/sec |  | 1,485 | 3,000 | 6,000 | 11,880 | 11,880 | 19,800 | 20,250 |
| Bit-Buffer Write |  | 0 | 0 | 0 | 0 | 0 | 1 | 1 |
| Bit-Buffer Read |  | 0 | 0 | 0 | 1 | 3 | 5 | 5 |
| Prediction Read | 8 | 5 | 11 | 21 | 42 | 42 | 70 | 72 |
|  | 16 | 6 | 12 | 23 | 46 | 46 | 76 | 78 |
|  | 32L | 7 | 14 | 28 | 56 | 56 | 94 | 96 |
|  | 64L | 11 | 22 | 43 | 85 | 85 | 142 | 145 |
|  | 128L | 21 | 43 | 86 | 170 | 170 | 284 | 290 |
|  | 256L | 43 | 86 | 172 | 341 | 341 | 568 | 581 |
|  | 512L | 85 | 172 | 344 | 681 | 681 | 1,135 | 1,161 |
|  | 32A | 6 | 13 | 26 | 52 | 52 | 86 | 88 |
|  | 64A | 8 | 16 | 32 | 64 | 64 | 106 | 109 |
|  | 128A | 10 | 20 | 40 | 79 | 79 | 132 | 135 |
|  | 256A | 15 | 31 | 61 | 122 | 122 | 203 | 207 |
|  | 512A | 24 | 49 | 98 | 195 | 195 | 324 | 332 |
| Deblocking Read |  | 0 | 0 | 1 | 2 | 2 | 3 | 3 |
| Pixel Write |  | 1 | 1 | 2 | 5 | 5 | 8 | 8 |
| Display (2 × 4:2:2) |  | 2 | 3 | 6 | 12 | 12 | 20 | 21 |
| TOTAL Bandwidth | 8 | 8 | 16 | 31 | 62 | 63 | 106 | 109 |
|  | 16 | 8 | 16 | 33 | 65 | 67 | 112 | 114 |
|  | 32L | 9 | 19 | 38 | 76 | 77 | 130 | 133 |
|  | 64L | 13 | 26 | 53 | 104 | 106 | 178 | 182 |
|  | 128L | 24 | 48 | 96 | 190 | 191 | 320 | 327 |
|  | 256L | 45 | 91 | 182 | 360 | 362 | 604 | 617 |
|  | 512L | 88 | 177 | 354 | 701 | 702 | 1,171 | 1,198 |
|  | 32A | 9 | 18 | 36 | 71 | 73 | 122 | 125 |
|  | 64A | 10 | 21 | 42 | 83 | 85 | 142 | 145 |
|  | 128A | 12 | 25 | 50 | 98 | 100 | 168 | 171 |
|  | 256A | 18 | 36 | 71 | 141 | 143 | 239 | 244 |
|  | 512A | 27 | 54 | 108 | 214 | 216 | 360 | 368 |
| Memory Clock (DDR) | x4 | 8 | 16 | 31 | 62 | 63 | 106 | 109 |
|  | x8 | 4 | 8 | 16 | 32 | 33 | 56 | 57 |
|  | x16L | 2 | 5 | 10 | 19 | 19 | 32 | 33 |
|  | x32L | 2 | 3 | 7 | 13 | 13 | 22 | 23 |
|  | x64L | 1 | 3 | 6 | 12 | 12 | 20 | 20 |
|  | x128L | 1 | 3 | 6 | 11 | 11 | 19 | 19 |
|  | x256L | 1 | 3 | 6 | 11 | 11 | 18 | 19 |
|  | x16A | 2 | 4 | 9 | 18 | 18 | 31 | 31 |
|  | x32A | 1 | 3 | 5 | 10 | 11 | 18 | 18 |
|  | x64A | 1 | 2 | 3 | 6 | 6 | 10 | 11 |
|  | x128A | 1 | 1 | 2 | 4 | 4 | 7 | 8 |
|  | x256A | 0 | 1 | 2 | 3 | 3 | 6 | 6 |

|  |  | H.264 Levels |  |  |  |  |  |  |
|---|---|---|---|---|---|---|---|---|
|  | Width | 3 (SD) | 3.1 | 3.2 | 4 (HD) | 4.1 | 5 | 5.1 |
| Max. Bit-Rate [Mbits/sec] |  | 10.000 | 14.000 | 20.000 | 20.000 | 50.000 | 135.000 | 240.000 |
| Max. Macroblocks/sec |  | 40,500 | 108,000 | 216,000 | 245,760 | 245,760 | 552,960 | 983,040 |
| Bit-Buffer Write |  | 1 | 2 | 3 | 3 | 6 | 17 | 30 |
| Bit-Buffer Read |  | 13 | 18 | 25 | 25 | 63 | 169 | 300 |
| Prediction Read | 8 | 111 | 226 | 451 | 513 | 513 | 1,155 | 2,053 |
|  | 16 | 119 | 238 | 477 | 543 | 543 | 1,221 | 2,171 |
|  | 32L | 148 | 283 | 567 | 645 | 645 | 1,451 | 2,579 |
|  | 64L | 228 | 418 | 836 | 952 | 952 | 2,141 | 3,806 |
|  | 128L | 456 | 719 | 1,438 | 1,636 | 1,636 | 3,681 | 6,543 |
|  | 256L | 912 | 1,438 | 2,875 | 3,272 | 3,272 | 7,361 | 13,086 |
|  | 512L | 1,825 | 2,875 | 5,751 | 6,543 | 6,543 | 14,722 | 26,172 |
|  | 32A | 130 | 256 | 511 | 582 | 582 | 1,309 | 2,328 |
|  | 64A | 161 | 304 | 608 | 692 | 692 | 1,557 | 2,768 |
|  | 128A | 187 | 346 | 691 | 786 | 786 | 1,769 | 3,146 |
|  | 256A | 290 | 511 | 1,023 | 1,164 | 1,164 | 2,619 | 4,656 |
|  | 512A | 415 | 719 | 1,438 | 1,636 | 1,636 | 3,681 | 6,543 |

TABLE 7-continued

| | | | | | | | | |
|---|---|---:|---:|---:|---:|---:|---:|---:|
| Deblocking Read | | | 5 | 14 | 28 | 31 | 31 | 71 | 126 |
| Pixel Write | | | 16 | 41 | 83 | 94 | 94 | 212 | 377 |
| Display (2 × 4:2:2) | | | 41 | 111 | 221 | 252 | 252 | 566 | 1,007 |
| TOTAL Bandwidth | | 8 | 187 | 411 | 810 | 918 | 959 | 2,190 | 3,893 |
| | | 16 | 195 | 424 | 836 | 948 | 989 | 2,256 | 4,011 |
| | | 32L | 224 | 469 | 926 | 1,050 | 1,091 | 2,486 | 4,419 |
| | | 64L | 304 | 603 | 1,196 | 1,357 | 1,398 | 3,176 | 5,646 |
| | | 128L | 532 | 904 | 1,797 | 2,041 | 2,082 | 4,715 | 8,383 |
| | | 256L | 988 | 1,623 | 3,235 | 3,677 | 3,718 | 8,396 | 14,926 |
| | | 512L | 1,901 | 3,061 | 6,110 | 6,948 | 6,989 | 15,757 | 28,012 |
| | | 32A | 206 | 441 | 871 | 987 | 1,028 | 2,344 | 4,168 |
| | | 64A | 237 | 489 | 968 | 1,097 | 1,138 | 2,592 | 4,608 |
| | | 128A | 263 | 531 | 1,050 | 1,191 | 1,233 | 2,804 | 4,986 |
| | | 256A | 366 | 697 | 1,382 | 1,569 | 1,610 | 3,654 | 6,496 |
| | | 512A | 491 | 904 | 1,797 | 2,041 | 2,082 | 4,715 | 8,383 |
| Memory Clock (DDR) | | x4 | 187 | 411 | 810 | 918 | 959 | 2,190 | 3,893 |
| | | x8 | 98 | 212 | 418 | 474 | 494 | 1,128 | 2,005 |
| | | x16L | 56 | 117 | 232 | 262 | 273 | 621 | 1,105 |
| | | x32L | 38 | 75 | 149 | 170 | 175 | 397 | 706 |
| | | x64L | 33 | 56 | 112 | 128 | 130 | 295 | 524 |
| | | x128L | 31 | 51 | 101 | 115 | 116 | 262 | 466 |
| | | x256L | 30 | 48 | 95 | 109 | 109 | 246 | 438 |
| | | x16A | 51 | 110 | 218 | 247 | 257 | 586 | 1,042 |
| | | x32A | 30 | 61 | 121 | 137 | 142 | 324 | 576 |
| | | x64A | 16 | 33 | 66 | 74 | 77 | 175 | 312 |
| | | x128A | 11 | 22 | 43 | 49 | 50 | 114 | 203 |
| | | x256A | 8 | 14 | 28 | 32 | 33 | 74 | 131 |

Current commercially available, cost-effective DDR memories use a clock frequency of 100 MHz to 166 MHz. More expensive DDR-II memories employ clock frequencies of 133 MHz to 266 MHz. The memory clock data in Table 7 show that, for H.264 levels 4 and above, a linear memory organization would require currently-impractical memory clock speeds, even for a relatively-wide, 256-bit memory bus. An array memory word architecture as described above allows the use of lower memory clock frequencies. Even for H.264 levels lower than 4, the array architecture may be preferred since it frees memory bandwidth for other functions integrated on the same chip.

An H.264 level 4 decoder with an array word organization can use 16-bit DDR-II or 32-bit DDR. If a linear word organization were used, the decoder would need 32-bit DDR-II or 64-bit DDR. The choice of memory type and bus width can have a significant impact on system cost and power consumption. For a linear word organization, the worst-case memory bandwidth required for level 5.1 cannot be supported under 266 MHz, even if a 256-bit memory bus is used. If an array word organization is used, 128-bit DDR-II or 256 DDR offer sufficient memory bandwidth for level 5.1.

FIGS. 7-A-D and 8-A-D show computed memory bandwidth savings, expressed as a percentage of total memory cycles, resulting from combining two 9×4 predictions, for a 32-bit memory bus with linear and array word organizations, respectively. The savings are shown as a function of the relative positions of the two predictions, for each possible position phase of the first reference. The central number in each figure section corresponds to coinciding upper-left corners for the two predictions. Because the two predictions are identical in size in this example, coinciding upper-left corners correspond to a 100% prediction overlap and memory bandwidth savings of 50%. As shown, in some cases memory bandwidth can be saved even if the two predictions do not overlap or are a few pels apart. Similar savings in memory cycles are obtained for both Linear and Array word organizations. Similar results can be obtained for other prediction sizes.

It will be clear to one skilled in the art that the above embodiments may be altered in many ways without departing from the scope of the invention. For example, a video decoder can be provided as part of an encoder, for providing reference frame data used in the encoding process. Accordingly, the scope of the invention should be determined by the following claims and their legal equivalents.

What is claimed is:

1. A video coding method comprising:
   determining a first number of memory access clock cycles needed to retrieve a first prediction from the random access memory;
   determining a second number of memory access clock cycles needed to retrieve a second prediction from the random access memory, the second prediction being distinct from the first prediction;
   determining a third number of memory access clock cycles needed to retrieve a combined prediction containing the first prediction and the second prediction from the random access memory;
   comparing the third number of clock cycles with a sum of the first number of clock cycles and the second number of clock cycles; and
   sending to the random access memory a memory read command to retrieve the combined prediction from the random access memory when the third number of clock cycles is less than or equal to the sum of the first number of clock cycles and the second number of clock cycles;
   wherein both the first and second predictions are image blocks that are located in a first image frame and associated with a macroblock in a second image, a first difference in the locations between the first predication and the macroblock being represented by a first motion vector, a second difference in the locations between the second predication and the macroblock being represented by a second motion vector;
   wherein each of the first prediction and the second prediction is smaller than or equal to the macroblock in size.

2. The method of claim 1, further comprising adding the first prediction to a first residual to generate a first target data set, and adding the second prediction to a second residual to generate a second target data set.

3. The method of claim 1, further comprising performing a first subtraction operation between a first target data set and the first prediction to generate a first residual, and a second subtraction operation between a second target data set and the second prediction to generate a second residual.

4. The method of claim 1, wherein the first prediction overlaps the second prediction.

5. The method of claim 1 wherein the first prediction does not overlap the second prediction.

6. The method of claim 1, wherein an area of the combined prediction is defined by a rectangle of minimal area that contains an area of the first prediction and an area of the second prediction, and that contains an integer number of memory words.

7. The method of claim 1, further comprising evaluating whether to combine the first prediction with each of a plurality of predictions.

8. The method of claim 7, further comprising evaluating whether to combine the combined prediction with each of at least a subset of the plurality of predictions.

9. The method of claim 1, further comprising retrieving the combined prediction from the random access memory when the third number of clock cycles is less than or equal to the sum of the first number of clock cycles and the second number of clock cycles.

10. The method of claim 1, wherein the combined prediction includes an image part present in neither of the first prediction and the second prediction.

11. The method of claim 1, wherein each of the first prediction and the second prediction has a luminance size of 4×4, 4×8, 8×8, 16×8 or 16×16.

12. A video coding method comprising:
comparing a memory bandwidth requirement for retrieving a combined prediction containing a first prediction and a second prediction from a random access memory with a memory bandwidth requirement for retrieving individually the first prediction and the second prediction from the random access memory; and
retrieving from the random access memory either the combined prediction or the first and second predictions individually according to a comparison of the memory bandwidth requirement for retrieving the combined prediction to the memory bandwidth requirement for retrieving individually the first prediction and the second prediction;
wherein both the first and second predictions are image blocks that are located in a first image frame and associated with a macroblock in a second image, a first difference in the locations between the first predication and the macroblock being represented by a first motion vector, a second difference in the locations between the second predication and the macroblock being represented by a second motion vector;
wherein each of the first prediction and the second prediction is smaller than or equal to the macroblock in size.

13. The method of claim 12, further comprising performing a video decoding operation using the first prediction and the second prediction.

14. The method of claim 12, further comprising performing a video encoding operation using the first prediction and the second prediction.

15. The method of claim 12, wherein the first prediction overlaps the second prediction.

16. The method of claim 12, wherein the first prediction does not overlap the second prediction.

17. The method of claim 12, wherein an area of the combined prediction is defined by a rectangle of minimal area that contains an area of the first prediction and an area of the second prediction, and that contains an integer number of memory words.

18. The method of claim 12, further comprising evaluating whether to combine the first prediction with each of a plurality of predictions.

19. The method of claim 18, further comprising evaluating whether to combine the combined prediction with each of at least a subset of the plurality of predictions.

20. The method of claim 12, comprising retrieving the combined prediction when the memory bandwidth requirement for retrieving the combined prediction is not larger than the memory bandwidth requirement for retrieving individually the first prediction.

21. The method of claim 12, wherein the combined prediction includes an image part present in neither of the first prediction and the second prediction.

22. The method of claim 12, wherein each of the first prediction and the second prediction has a luminance size of 4×4, 4×8, 8×8, 16×8 or 16×16.

23. A video coding apparatus comprising:
comparison logic for comparing a memory bandwidth requirement for retrieving a combined prediction containing a first prediction and a second prediction from a random access memory with a memory bandwidth requirement for retrieving individually the first prediction and the second prediction from the random access memory; and
memory access logic connected to the comparison logic, for retrieving the combined prediction or the first and second predictions individually according to a result of complaining the memory bandwidth requirement for retrieving the combined prediction to the memory bandwidth requirement for retrieving individually the first prediction and the second prediction;
both the first and second predictions are image blocks that are located in a first image frame and associated with a macroblock in a second image, a first difference in the locations between the first predication and the macroblock being represented by a first motion vector, a second difference in the locations between the second predication and the macroblock being represented by a second motion vector;
wherein each of the first prediction and the second prediction is smaller than or equal to the macroblock in size.

24. The apparatus of claim 23, wherein the first prediction overlaps the second prediction.

25. The apparatus of claim 23, wherein the memory access logic is configured to retrieve the combined prediction when the memory bandwidth requirement for retrieving the combined prediction is not larger than the memory bandwidth requirement for retrieving individually the first prediction and the second prediction.

26. The apparatus of claim 23, wherein the combined prediction includes an image part present in neither of the first prediction and the second prediction.

27. The apparatus of claim 23, wherein each of the first prediction and the second prediction has a luminance size of 4×4, 4×8, 8×8, 16×8 or 16×16.

28. A video coding apparatus comprising:
means for comparing a memory bandwidth requirement for retrieving a combined prediction containing a first prediction and a second prediction from a random access memory with a memory bandwidth requirement for retrieving individually the first prediction and the second prediction from the random access memory; and means for retrieving the combined prediction or the first and second predictions individually according to a result of comparing of the memory bandwidth requirement for retrieving the combined prediction to the memory bandwidth requirement for retrieving individually the first prediction and the second prediction;

wherein both the first and second predictions are image blocks that are located in a first image frame and associated with a macroblock in a second image, a first difference in the locations between the first predication and the macroblock being represented by a first motion vector, a second difference in the locations between the second predication and the macroblock being represented by a second motion vector;

wherein each of the first prediction and the second prediction is smaller than or equal to the macroblock in size.

29. The apparatus of claim 28, wherein the first prediction overlaps the second prediction.

30. The apparatus of claim 28, wherein the means for retrieving either the combined prediction or the first and second predictions individually is configured to retrieve the combined prediction when the memory bandwidth requirement for retrieving the combined prediction is not larger than the memory bandwidth requirement for retrieving individually the first prediction and the second prediction.

31. The apparatus of claim 28, wherein the combined prediction includes an image part present in neither of the first prediction and the second prediction.

32. The apparatus of claim 28, wherein each of the first prediction and the second prediction has a luminance size of 4×4, 4×8, 8×8, 16×8 or 16×16.

* * * * *

UNITED STATES PATENT AND TRADEMARK OFFICE
CERTIFICATE OF CORRECTION

PATENT NO. : 8,165,219 B2  Page 1 of 1
APPLICATION NO. : 10/794280
DATED : April 24, 2012
INVENTOR(S) : Sorin C. Cismas It is certified that error appears in the above-identified patent and that said Letters Patent is hereby corrected as shown below:

Column 19; line 31  Delete "4×8, 8×8, 16×8 or 16×16" and insert -- 4×8, 8×4, 8×8, 16×8 or 16×16 --

Column 20; line 21  Delete "4×4, 4×8, 8×8, 16×8 or 16×16" and insert -- 4×4, 4×8, 8×4, 8×8, 16×8 or 16×16 --

Column 20; line 60  Delete "4×4, 4×8, 8×8, 16×8 or 16×16" and insert -- 4×4, 4×8, 8×4, 8×8, 16×8 or 16×16 --

Column 22; line 15  Delete "4×4, 4×8, 8×8, 16×8 or 16×16" and insert -- 4×4, 4×8, 8×4, 8×8, 16×8 or 16×16 --

Signed and Sealed this
Third Day of July, 2012

David J. Kappos
*Director of the United States Patent and Trademark Office*